United States Patent
Hiroki et al.

(10) Patent No.: US 10,304,214 B2
(45) Date of Patent: May 28, 2019

(54) ELECTRONIC DEVICE AND OPERATING METHOD OF THE SAME

(71) Applicant: SAMSUNG ELECTRONICS CO., LTD., Suwon-si (KR)

(72) Inventors: Mizuno Hiroki, Yokohama (JP); Sang-on Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 30 days.

(21) Appl. No.: 15/347,266

(22) Filed: Nov. 9, 2016

(65) Prior Publication Data

US 2017/0132809 A1 May 11, 2017

(30) Foreign Application Priority Data

Nov. 9, 2015 (JP) .................................. 2015-219334
Sep. 19, 2016 (KR) ........................ 10-2016-0119552

(51) Int. Cl.
  *G06T 9/20* (2006.01)
  *G06K 9/62* (2006.01)
  (Continued)

(52) U.S. Cl.
  CPC .............. *G06T 9/20* (2013.01); *G06K 9/4652* (2013.01); *G06K 9/6202* (2013.01); *G09G 5/003* (2013.01);
  (Continued)

(58) Field of Classification Search
  None
  See application file for complete search history.

(56) References Cited

U.S. PATENT DOCUMENTS 6,981,644 B2   1/2006   Cheong et al.
7,949,259 B2   5/2011   Suzuki
(Continued)

FOREIGN PATENT DOCUMENTS

JP   2007-81703 A    3/2007
JP   2008-252570 A   10/2008
(Continued)

OTHER PUBLICATIONS

International Search Report and Written Opinion dated Dec. 22, 2016 issued by the International Searching Authority in counterpart International Application No. PCT/KR2016/012773 (PCT/ISA/210, PCT/ISA/220, and PCT/ISA/237).
(Continued)

*Primary Examiner* — Nurun N Flora
(74) *Attorney, Agent, or Firm* — Sughrue Mion, PLLC

(57) ABSTRACT

Provided are an electronic device and an operating method for communication using a two-dimensional (2D) color code. The electronic device includes a memory storing instructions and at least one processor coupled to the memory and configured to execute the instructions to obtain an image including a 2D color code in which a plurality of cells are located, the plurality of cells comprising base cells and data cells, detect an outline in the image including the 2D color code, based on a first figure of the base cells, a color of the base cells, and a second figure whose vertex is defined by the base cells, detect the base cells among objects that are identified based on the detected outline, detect the 2D color code in the image based on the detected base cells in the 2D color code and decode colors of the data cells included in the 2D color code to obtain data.

18 Claims, 31 Drawing Sheets

(51) Int. Cl.
*G06K 9/46* (2006.01)
*G09G 5/02* (2006.01)
*G09G 5/00* (2006.01)
*G09G 3/20* (2006.01)
*H04W 88/02* (2009.01)

(52) U.S. Cl.
CPC ...... *G09G 5/02* (2013.01); *G06T 2207/10016* (2013.01); *G09G 3/2003* (2013.01); *G09G 2360/145* (2013.01); *G09G 2370/18* (2013.01); *H04W 88/02* (2013.01)

(56) References Cited

U.S. PATENT DOCUMENTS

| | | |
|---|---|---|
| 8,879,859 B2 | 11/2014 | Cheong et al. |
| 2004/0182930 A1* | 9/2004 | Nojiri ............. G06K 19/06037 235/462.04 |
| 2007/0181684 A1* | 8/2007 | Takano ................. A63F 1/02 235/454 |
| 2007/0272755 A1* | 11/2007 | Chang ..................... G06K 7/14 235/462.11 |
| 2009/0184171 A1 | 7/2009 | Lv et al. |
| 2009/0232392 A1 | 9/2009 | Kiuchi et al. |
| 2010/0246984 A1* | 9/2010 | Cheong .................. G06T 1/005 382/233 |
| 2013/0230241 A1 | 9/2013 | Cheong et al. |
| 2014/0267369 A1 | 9/2014 | Mesh-Iliescu et al. |
| 2016/0112125 A1 | 4/2016 | Yokoi et al. |
| 2016/0248504 A1 | 8/2016 | Togashi |

FOREIGN PATENT DOCUMENTS

| | | |
|---|---|---|
| JP | 2011-186613 A | 9/2011 |
| JP | 4848427 B2 | 12/2011 |
| JP | 2014-116706 A | 6/2014 |
| JP | 2014-157475 A | 8/2014 |
| JP | 2016-82425 A | 5/2016 |
| KR | 10-0339691 B1 | 6/2002 |
| KR | 10-1109510 B1 | 1/2012 |
| KR | 10-1403847 B1 | 6/2014 |
| WO | 2007/108053 A1 | 9/2007 |

OTHER PUBLICATIONS

Hiroki Mizuno et al., "Performance of CSK communication systems with Display and Cameras", The Institute of Electronics, Information and Communication Engineers, Technical Report of IEICE. (2011) (6 pages Total).

Atsuya Yokoi et al., "CSK communication systems with Displays and Cameras", IEICE, B-15-10, Samsung R&D Institute Japan, and Samsung Electronics Co., Ltd.(2013) (p. 482, 4 Pages total with translation).

* cited by examiner

64x64SDM-16CSK

16x16SDM-4CSK

4x4SDM-4CSK

FIG. 30

| FRTN | D12 | D26 | D40 |
|------|-----|-----|-----|
| FREM | D13 | D27 | D41 |
| D0   | D14 | D28 | D42 |
| D1   | D15 | D29 | D43 |
| D2   | D16 | D30 | D44 |
| D3   | D17 | D31 | D45 |
| D4   | D18 | D32 | D46 |
| D5   | D19 | D33 | D47 |
| D6   | D20 | D34 | D48 |
| D7   | D21 | D35 | D49 |
| D8   | D22 | D36 | P0  |
| D9   | D23 | D37 | P1  |
| D10  | D24 | D38 | P2  |
| D11  | D25 | D39 | P3  |

Reference Cell

CSK Frame Area Data (D0–D49)

Reference Cell

4CSK Code (16 × 16)

ELECTRONIC DEVICE AND OPERATING METHOD OF THE SAME

CROSS-REFERENCE TO RELATED APPLICATIONS

This application claims priority from Japanese Patent Application No. 2015-219334, filed on Nov. 9, 2015, in the Japan Patent Office, and Korean Patent Application No. 10-2016-0119552, filed on Sep. 19, 2016, in the Korean Intellectual Patent Office, the disclosures of which are incorporated herein by reference in their entireties.

BACKGROUND

1. Field

Apparatuses and methods consistent with exemplary embodiments relate to communication using a two-dimensional (2D) color code.

2. Description of Related Art

A visible light communication system using visible light as a carrier wave may use a light source, such as a white light-emitting diode (LED), to emit a single color, or use a plurality of light sources such as red-green-blue (RGB) LEDs, to emit a plurality of colors.

A system using the RGB LEDs has higher capability with respect to high speed transmission than a system using the white LEDs. The RGB LEDs generally have a quicker response speed than a white LED, and the RGB LEDs have more bits to be encoded than the white LED. A way to transmit information according to different colors is referred to as color multiplexing or wavelength multiplexing.

SUMMARY

One or more exemplary embodiments provide an electronic device and an operating method thereof for communication using a two-dimensional (2D) color code.

According to an exemplary embodiment, there is provided an electronic device including a memory configured to store instructions; and at least one processor, coupled to the memory, configured to execute the instructions to: obtain an image including a two-dimensional (2D) color code in which a plurality of cells are located, the plurality of cells including base cells and data cells; detect an outline in the image including the 2D color code; based on a first figure of the base cells, a color of the base cells, and a second figure whose vertex is defined by the base cells, detect the base cells among objects that are identified based on the detected outline; detect the 2D color code in the image based on the detected base cells in the 2D color code; and decode colors of the data cells included in the 2D color code to obtain data.

The base cells included in the 2D color code may have an outline with a color that is different from the color of the base cells.

The first figure of the base cells may be circular.

Figures of the plurality of cells may be circular.

The memory may be further configured to store information about the first figure, the second figure, the color of the base cells, and a location of the base cells in the 2D color code.

The plurality of cells included in the 2D color code may further include reference cells; the processor may be further configured to execute the instructions to: based on the first figure of the base cells, the color of the base cells, and the second figure whose vertex may be defined by the base cells, detect candidates of the base cells among the objects that may be identified based on the detected outline; detect candidates of the reference cells based on a location of the candidates of the base cells; and determine a validity of the candidates of the base cells based on a color of the candidates of the reference cells and a color of the reference cells.

The memory may be further configured to store information about the first figure, the second figure, the color of the base cells, a location of the base cells in the 2D color code, and a color and a location of the reference cells in the 2D color code.

The image may include a plurality of frame images; and the processor may be further configured to execute the instructions to detect base cells in one frame image among the plurality of the frame images based on base cells detected in a previous frame image.

The processor may be further configured to execute the instructions to limit a region to detect the base cells in the one frame image among the plurality of the frame images, based on the base cells detected in the previous frame image.

The processor may be further configured to execute the instructions to: generate a component image by converting the image based on a predetermined component; generate a binary image by converting the component image based on a predetermined threshold; and detect the outline based on the binary image.

According to an aspect of another exemplary embodiment, there is provided an operating method of an electronic device, the operating method including: obtaining an image including a two-dimensional (2D) color code in which a plurality of cells are located, the plurality of cells including base cells and data cells; detecting an outline in the image including the 2D color code; based on a first figure of the base cells, a color of the base cells, and a second figure whose vertex is defined by the base cells, detecting the base cells among objects that are identified based on the detected outline; detecting the 2D color code in the image, based on the detected base cells in the 2D color code; and decoding colors of the data cells included in the 2D color code to obtain data.

The base cells included in the 2D color code may have an outline with a color that is different from the color of the base cells.

The first figure of the base cells may be circular.

Figures of the plurality of cells may be circular.

The method may include storing information about the first figure, the second figure, the color of the base cells, and a location of the base cells in the 2D color code.

The plurality of cells included in the 2D color code may further include reference cells, wherein the detecting of the base cells may include: based on the first figure of the base cells, the color of the base cells, and the second figure whose vertex is defined by the base cells, detecting candidates of the base cells among the objects that may be identified based on the detected outline; detecting candidates of the reference cells based on a location of the candidates of the base cells; and determining a validity of the candidates of the base cells based on a color of the candidates of the reference cells and a color of the reference cells.

The method may include storing information about the first figure, the second figure, the color of the base cells, a location of the base cells in the 2D color code, and a color and a location of the reference cells in the 2D color code.

The image may include a plurality of frame images; and the detecting of the base cells may include detecting base cells in one frame image among the plurality of the frame images based on base cells detected in a previous frame image.

The detecting of the base cells may include limiting a region to detect the base cells in the one frame image among the plurality of the frame images based on the base cells detected in the previous frame image.

According to an aspect of another exemplary embodiment, there is provided an electronic device including: a memory configured to store instructions; and at least one processor, coupled to the memory, configured to execute the instructions to: generate a two-dimensional (2D) color code in which a plurality of cells are located, the plurality of cells including base cells and data cells; and display an image including the generated 2D color code, wherein the 2D color code is generated based on a first figure of the base cells, a color of the base cells, and a second figure whose vertex is defined by the base cells such that the base cells among objects that are identified based on an outline are detected by another device, the outline being detected in the image including the generated 2D color code.

BRIEF DESCRIPTION OF THE DRAWINGS

FIG. 30 illustrates an example 2D color code; and

DESCRIPTION OF EXEMPLARY EMBODIMENTS

It should be understood that the terms "comprises," "comprising," "including," and "having" are inclusive and therefore specify the presence of stated features or components, but do not preclude the presence or addition of one or more other features or components. Terms such as " . . . unit" and " . . . module" should be understood as a unit or module in which at least one function or operation is processed and may be embodied as hardware, software, or a combination of hardware and software.

Reference will now be made in detail to exemplary embodiments, examples of which are illustrated in the accompanying drawings.

Figure 1:
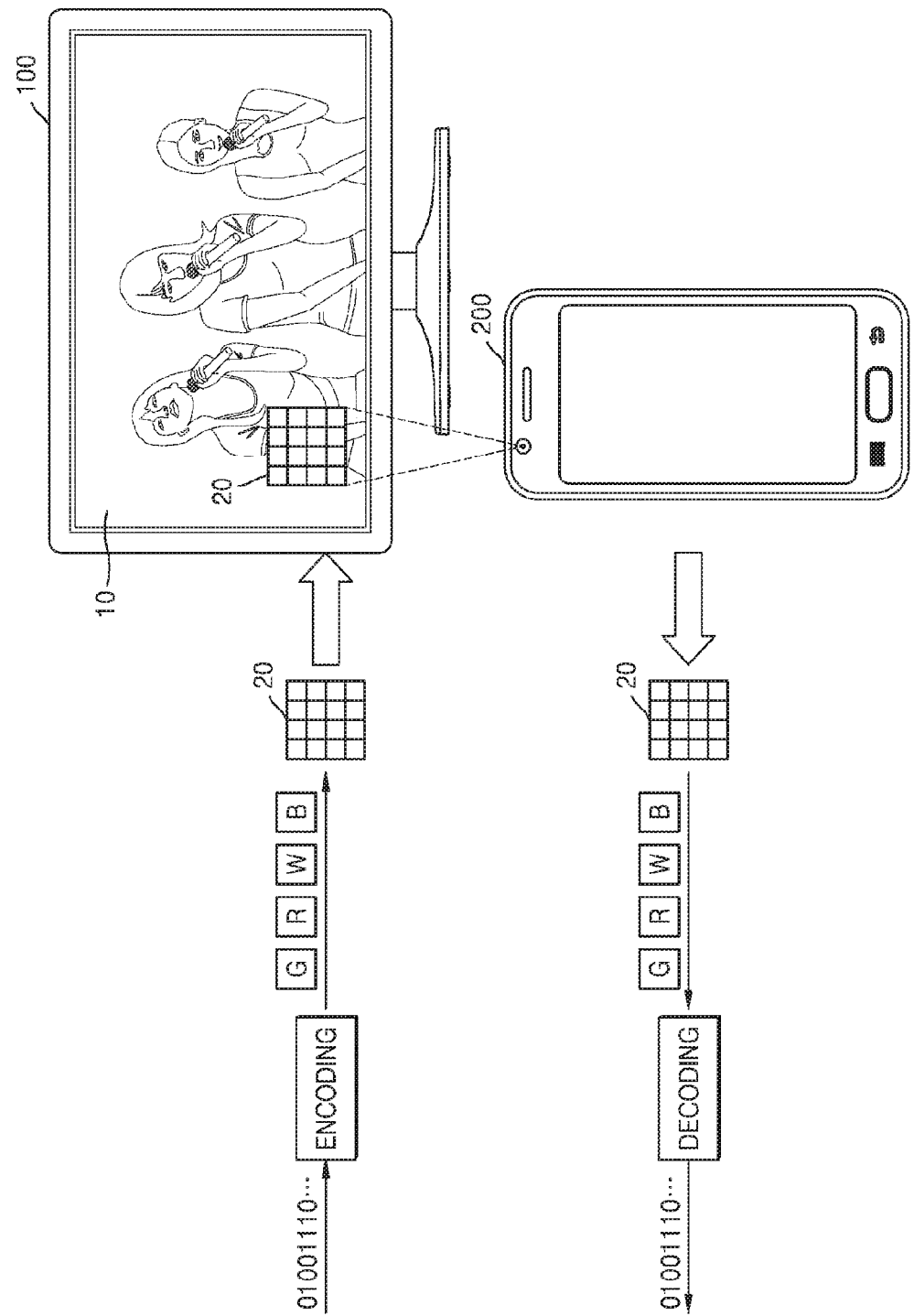
FIG. 1 illustrates a visible light communication system including a displaying device and an electronic device, according to an exemplary embodiment.

FIG. 1 illustrates a visible light communication system including a displaying device and an electronic device, according to an exemplary embodiment.

The displaying device 100 may display a two-dimensional (2D) color code 20 generated based on data to be transmitted. The data to be transmitted by the displaying device 100 may be referred to as transmission data.

The displaying device 100 may encode the transmission data to a plurality of data cells such as G, R, B, and W, which respectively have a color. For example, 2-bit data such as "00", "01", "10", and "11" may be respectively encoded to an R data cell, a G data cell, a B data cell, and a W data cell. Therefore, a bit stream of "01001110" may be encoded to data cells of G, R, W, and B. The above method is merely an example, and the encoding method is not limited thereto. The displaying device 100 may generate a 2D color code where a plurality of data cells such as G, R, W, and B are arranged. The 2D color code in which the plurality of data cells is arranged may be referred to as a space division multiplex (SDM) code. The use of the SDM code may increase data bandwidth. The 2D color code 20 is illustrated in FIG. 1 to have data cells in the form of a 4×4 matrix, but is not limited thereto.

The displaying device 100 may display the 2D color code 20 on a background image 10. The displaying device 100 may display the 2D color code 20 by emitting colors corresponding to a plurality of data cells.

The electronic device 200 may obtain the 2D color code 20 by capturing the 2D color code 20 displayed by the displaying device 100. The electronic device 200 may include a camera for capturing the 2D color code 20. The electronic device 200 may obtain the 2D color code 20 from another device which captures the 2D color code 20. The electronic device 200 may detect the 2D color code 20 in the image, and obtain data cells such as G, R, W, and B included in the detected 2D color code 20. The electronic device 200 may decode colors of the data cells such as G, R, W, and B to obtain data such as a bit stream of "01001110 . . . ". Therefore, the electronic device 200 may obtain transmission data such as a bit stream of "01001110 . . . " which is transmitted by the displaying device 100, based on the 2D color code 20. The electronic device 200 may output the obtained data or perform an operation corresponding to the obtained data. As such, the displaying device 100 and the electronic device 200 may communicate data by visible light communication.

The displaying device 100 may be any electronic device or any computing device capable of displaying the 2D color code 20. The displaying device 100 may be a smart phone, a tablet terminal, a personal computer (PC), a digital signage device, or a television set-top box, but is not limited thereto.

The electronic device 200 may be any electronic device or any computing device capable of obtaining an image including the 2D color code 20 to obtain data. The electronic device 200 may be a smart phone, a tablet terminal, a PC, or a digital camera, but is not limited thereto.

The electronic device 200 may perform a process for detecting the 2D color code 20 in an image including the 2D color code 20. The 2D color code 20 may include base cells so that the electronic device 200 may detect the 2D color code 20 in the image. An explanation of the 2D color code 20 including base cells according to an exemplary embodiment is described below.

Figure 2:
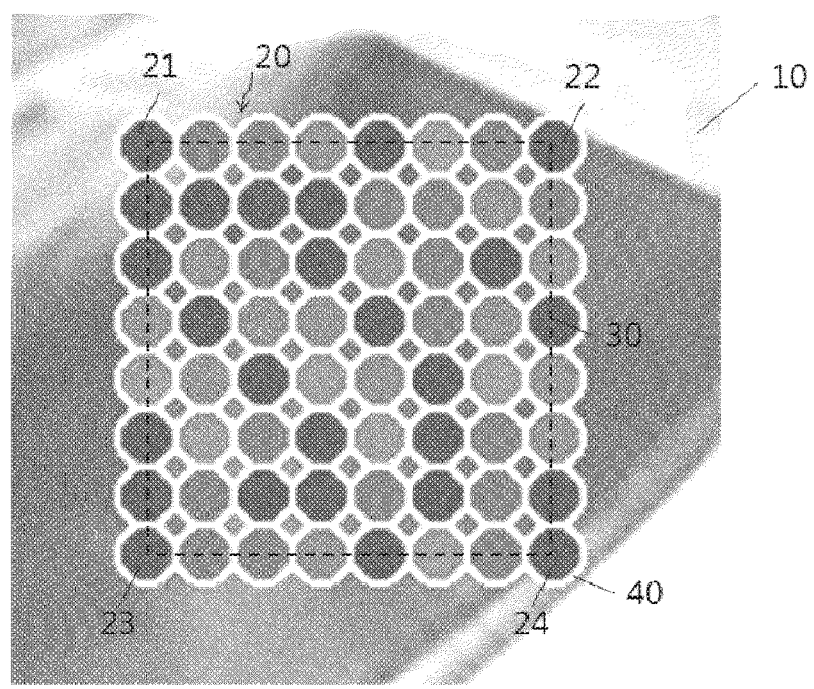
FIG. 2 illustrates a two-dimensional (2D) color code according to an exemplary embodiment.

FIG. 2 illustrates a 2D color code, according to an exemplary embodiment.

Referring to FIG. 2, the 2D color code 20 may be displayed on a background image 10. The 2D color code 20 may be a group of cells comprised of a plurality of cells. The 2D color code 20 is illustrated in FIG. 2 to have a plurality of cells in the form of an 8×8 matrix. However, FIG. 2 is merely an example, and the number or arrangement of cells in the 2D color code 20 is not limited thereto.

A plurality of cells included in the 2D color code 20 may include a plurality of base cells 21, 22, 23, and 24 and data cells. Cells which are not the base cells 21, 22, 23, and 24 may be the data cells.

The base cells 21, 22, 23, and 24 may be a base for the electronic device 200 to detect the 2D color code 20 in an image including the 2D color code 20. The base cells 21, 22, 23, and 24 may be used to identify a location of the 2D color code 20 in the image when extracting the 2D color code 20 from the image including the 2D color code 20.

Each of the base cells 21, 22, 23, and 24 has a figure, and appear as its figure in the displaying device 100. For example, all of the base cells 21, 22, 23, and 24 have a circular figure in FIG. 2.

A figure, a color, and a location of the base cells 21, 22, 23, and 24 in the 2D color code 20 may be preset. A FIG. 30 having vertices at the base cells 21, 22, 23, and 24 may be preset. The figure of the base cells 21, 22, 23, and 24 is referred to as a first figure, and the FIG. 30 having vertices at the base cells 21, 22, 23, and 24 is referred to as a second figure.

The first figure of base cells 21, 22, 23, and 24 is circular, and the second figure having vertices at the base cells 21, 22, 23, and 24 is rectangular in FIG. 2. Base cells 21 and 22 may have a first color such as green, and base cells 22 and 24 may have a second color such as red. The base cells 21, 22, 23, and 24 may be located at each corner of the 2D color code 20. FIG. 2 merely illustrates an example and is not limited with respect to a first figure, a second figure, a color, the number, and a location of the base cells 21, 22, 23, and 24 in the 2D color code 20. The first color and the second color are used as a color of the base cells 21, 22, 23, and 24 in FIG. 2, but are not limited thereto. For example, a single color may be used as a color of the base cells 21, 22, 23, and 24, or three or more colors may be used as a color of the base cells 21, 22, 23, and 24.

Each of the base cells 21, 22, 23, and 24 may be respectively comprised of a first figure (For example, a circle in FIG. 2) and an outline 40 surrounding the first figure. The outline 40 may be represented by an edge, a borderline, or a boundary. The base cells 21, 22, 23, and 24 may have the outline 40 with a color different from the background image 10. Therefore, the 2D color code 20 which is overlaid on any background image 10 is identifiable. The outline 40 of the base cells 21, 22, 23, and 24 may have a color different from an inner color of the base cells 21, 22, 23, and 24.

In FIG. 2, the outline 40 of the base cells 21, 22, 23, and 24 have a white borderline with a predetermined width. A color of the outline 40 is not limited to white, and may be a variety of colors.

In addition to the base cells 21, 22, 23, and 24, each cell in the 2D color code 20 may have a circular figure, the outline 40 of each cell may have a color different from the inner part. The outline 40 of each cell in the 2D color code 20 may have a borderline with a preset color.

Figure 3:
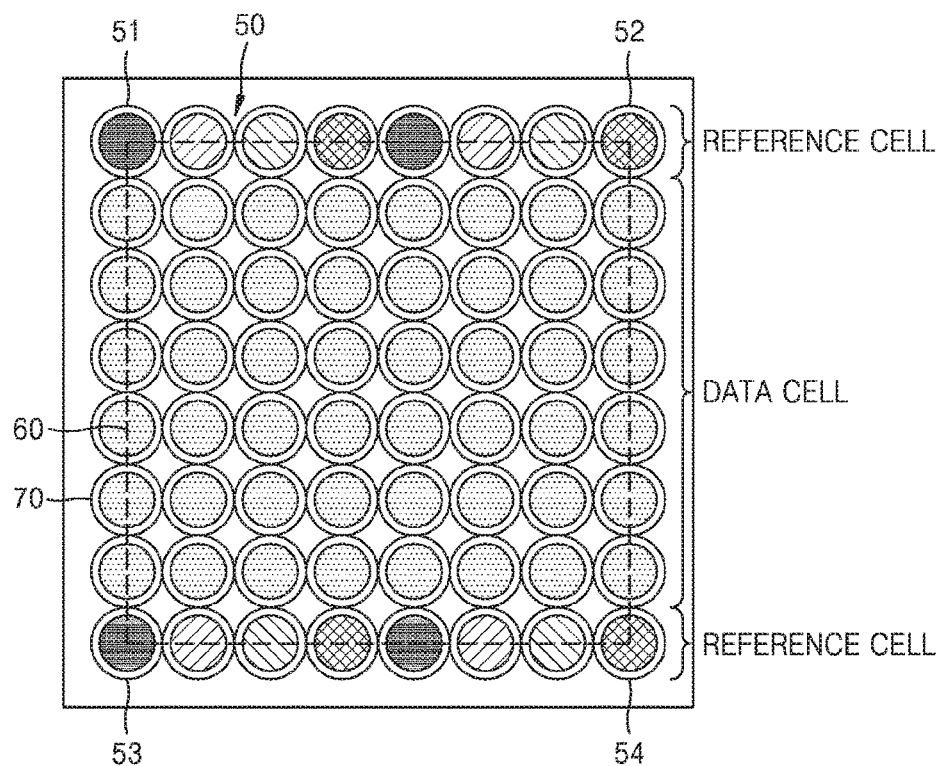
FIG. 3 illustrates a 2D color code including reference cells according to an exemplary embodiment.

FIG. 3 illustrates a 2D color code including reference cells, according to an exemplary embodiment.

Referring to FIG. 3, the 2D color code 50 may be a group of cells comprised of a plurality of cells. The plurality of cells may include a plurality of base cells 51, 52, 53, and 54, and data cells. Among objects identified by the outlines 70, the base cells 51, 52, 53, and 54 may be detected based on a first figure which is a figure of the base cells 51, 52, 53, and 54, colors of the base cells 51, 52, 53, and 54, and a second FIG. 70 having vertices at the base cells 51, 52, 53, and 54. The plurality of cells may further include reference cells. The plurality of data cells may be referred to as a data cell group, the plurality of reference cells may be referred to as a reference cell group. The plurality of cells may further include a control cell. The control cell may include frame information, and error-correcting codes when the 2D color code 50 is represented by a video, but is not limited thereto. The frame information may represent the number of frames, the number of remaining frames, etc.

Except for the 2D color code 50 including the reference cell group, descriptions of the 2D color code 20 of FIG. 2 are also applicable to the 2D color code 50. Therefore, redundant explanation is omitted.

A color and a location of the reference cells are included in the 2D color code 50. The reference cell group and the base cells 51, 52, 53, and 54 may have a predetermined location relation. The 2D color code 50 may include the plurality of reference cells which are located according to the location relation with the base cells 51, 52, 53, and 54. The reference cells may be used for adjusting colors of the data cells when the electronic device 200 decodes the data cells. By such color adjustment, a difference between colors displayed by the displaying device 100 and recognized by the electronic device 200 may decrease. The difference between colors may result from coherent light or color characteristics of the display 120 of the displaying device 100 or the camera 210 of the electronic device 200. The electronic device 200 may perform the color adjustment using the reference cells.

In FIG. 3, cells along first and eighth lines of the 2D color code 50 in an 8×8 matrix represent the reference cells, and cells along second and seventh lines represent the data cells. That is, the reference cells are located along the upper and lower sides of a rectangle which is represented by the data cell group of the 2D color code 50. FIG. 3 merely illustrates an example, and the number and locations of the reference cells in the 2D color code 50, and location relation between the reference cell group and the base cells 51, 52, 53, and 54 are not limited thereto. FIG. 3 illustrates that some of the reference cells are the base cells 51, 52, 53, and 54, but the base cells 51, 52, 53, and 54 might not be the reference cells.

The plurality of reference cells may be arranged in an order in the 2D color code 50. The plurality of reference cells may be arranged in a line with a predetermined color, and a certain order of arrangement may be repeated in the line. For example, referring to FIG. 3, the 2D color code 50 has first and eighth lines in each of which arrangement of four reference cells is repeated twice. That is, four reference colors for the reference cells are illustrated in FIG. 3. Referring to FIG. 3, the 2D color code 50 has the upper reference cell group and the lower reference cell group in each of which the four reference cells are arranged in the same order, but not limited thereto, and the four reference cells may be arranged in different order in each arrangement.

A color of a reference cell is referred to as a reference color, and a color of a data cell is referred to as the data color. Reference colors and data colors may have a color in common. For example, four reference colors may have the same colors as the data colors of the data cells. Coincidence between the reference color and the data color may limit colors used in the 2D color code 50. However, the reference color may be set without regard to the data color.

Figure 4:
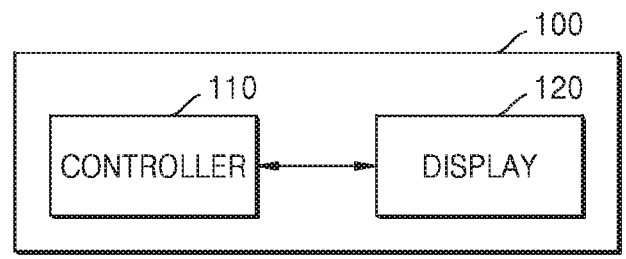
FIG. 4 illustrates a displaying device according to an exemplary embodiment.

FIG. 4 illustrates a displaying device according to an exemplary embodiment.

Referring to FIG. 4, the displaying device 100 may include a controller 110 and a display 120. The displaying device 100 may include the controller 110, but not the display 120, and another device may display the 2D color code. That is, the display 120 may be a component a device other than the displaying device 100.

The controller 110 controls overall operations of the displaying device 100. For example, the controller 110 may include at least one processor, a central processing unit (CPU), a micro processor, or a graphics processing unit (GPU), but is not limited thereto. The controller 110 may include a plurality of modules, and each module may perform at least one function or at least one operation.

The displaying device 100 may further include a memory for storing a program, one or more instructions, or data. The controller 110 may perform an operation according to the program, instructions, or data. At least one processor included in the controller 110 may be coupled to the memory and configured to execute the one or more instructions stored in the memory.

The controller 110 may perform an operation to generate the 2D color code. The controller 110 may control the display 120 to display the generated 2D color code. The display 120 may be embodied as a display or a projector. The display 120 may display the 2D color code according to control of the controller 110.

The controller 110 may generate a video including the 2D color code at a certain frame rate. The display 120 may display the generated video including the 2D color code at the certain frame rate. Therefore, the display 120 may display a plurality of continuous frame images.

The controller 110 may encode transmission data to the plurality of data cells which respectively have colors. The encoding may be referred to as ciphering. The controller 110 may generate the 2D color code by arranging the plurality of data cells and the plurality of base cells in the 2D color code.

An explanation of the base cells and the 2D color code is described in FIGS. 1, 2, and 3, and thus redundant explanations will be omitted.

The controller 110 may cause the 2D color code to include the base cells based on information regarding the base cells. The information regarding the base cells may represent at least one from among the first figure, the second figure and colors of the base cells, and locations of the base cells in the 2D color code. The memory of the displaying device 100 may store the information regarding the base cells.

The controller 110 may generate the 2D color code by locating the base cells and the data cells at certain locations according to a certain order.

The controller 110 may cause the 2D color code to further include the reference cells. The controller 110 may cause the 2D color code to include the reference cells based on the information regarding the reference cells. The controller 110 may generate the 2D color code by locating the base cells, the data cells and the reference cells at certain locations according to certain orders.

The information regarding the reference cells may represent at least one from among locations and colors of the reference cells in the 2D color code, and location relations between the reference cells and the base cells. The information regarding the reference cells may further include information regarding arrangement of the reference cells such as how many times the reference colors are repeated in a particular order. The memory of the displaying device 100 may further store information regarding the reference cells.

The plurality of data cells generated by the controller 110 may respectively have a color corresponding to one of data symbols which are defined on chromaticity coordinates. A color shift keying (CSK) method is used to set data symbols on chromaticity coordinates and assign a bit string to each data symbol to display colors of the data symbols. The CSK method has less sensitivity to attenuation or disturbance in a light communication channel, and allows colors and transmission speed to be changed easily. The CSK guarantees stable communication access on chromaticity coordinates and a steady intensity of luminescence, thus reducing flicker due to luminance changes.

Figure 5:
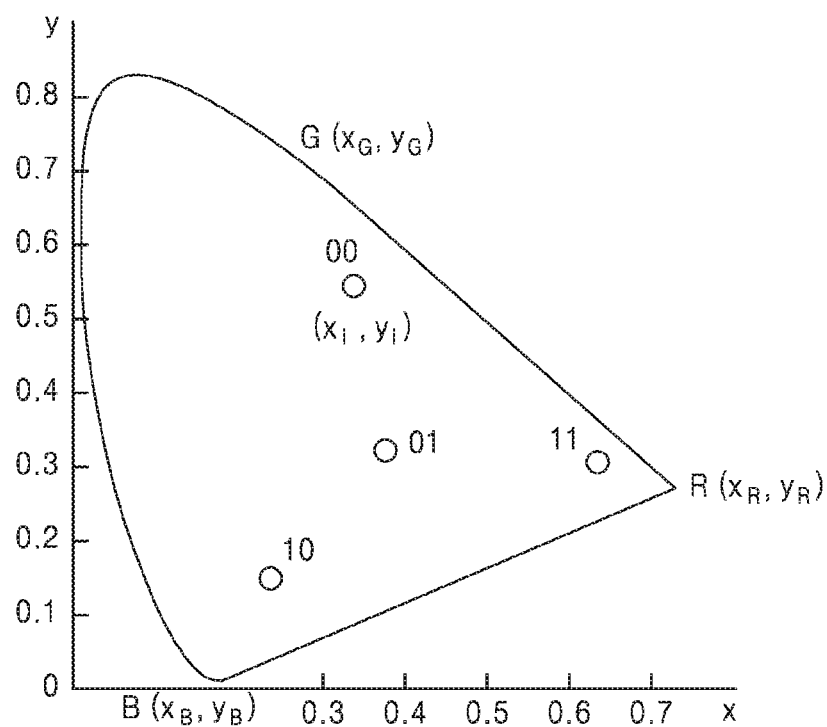
FIG. 5 illustrates an example of color shift keying (CSK) on chromaticity coordinates.

FIG. 5 illustrates an example of CSK on chromaticity coordinates. The chromaticity coordinates of FIG. 5 represent CIE 1931 xy chromaticity coordinates.

Referring to FIG. 5, four data symbols are set on the chromaticity coordinates, bit strings 00, 01, 10 and 11 are assigned to the four data symbols. A method of locating four data symbols on chromaticity coordinates is referred to as 4 CSK. Arrangement of data symbols is referred to as data symbol mapping. Each data symbol represents a color of the chromaticity coordinates.

The controller 110 of the displaying device 100 may convert transmission data to data cells, each two bits of the transmission data being converted to a data cell having a color of one data symbol selected from among four data symbols according to a mapping rule. The above method may be referred to as quadrature phase-shift keying (QPSK) which generates one data symbol per two bits input. Each data cell has a color of one data symbol, that is, two bits of information (2 bits/Symbol).

When the 2D color code includes the reference cells as illustrated in FIG. 3, reference symbols corresponding to the reference cells may be set on the chromaticity coordinates. Each reference symbol may correspond to a color on the chromaticity coordinates. The reference symbols may coincide with the data symbols corresponding to the data cells on the chromaticity coordinates. According to an exemplary embodiment, the reference symbols may be set on the chromaticity coordinates without regard to the data symbols corresponding to the data cells.

The controller 110 may convert a point (x, y) on the chromaticity coordinates to a value of (R, G, B) representing a luminescence-intensity of a tri-color LED. For example, a relationship between a point $(x_i, y_i)$ on the chromaticity coordinates and a luminescence-intensity (R, G, B) may be defined by Equation 1 as follows:

$$x_i = R \cdot x_R + G \cdot x_G + B \cdot x_B$$

$$y_i = R \cdot y_R + G \cdot y_G + B \cdot y_B$$

$$R + G + B = 1 \quad \text{[Equation 1]}$$

Three points of $(x_R, y_R)$, $(x_G, y_e)$, and $(x_B, y_B)$ on the chromaticity coordinates respectively correspond to each of luminescence colors R, G, and B of a tri-color LED. The display 120 may include tri-color LEDs The displaying device 100 may drive tri-color LEDs according to a luminescence-intensity (R, G, B) which is derived by Equation 1, that is, the displaying device 100 may adjust light-intensity of each LEDs according to the luminescence-intensity (R, G, B) to generate signal light of a color corresponding to the point $(x_i, y_i)$.

Figure 6:
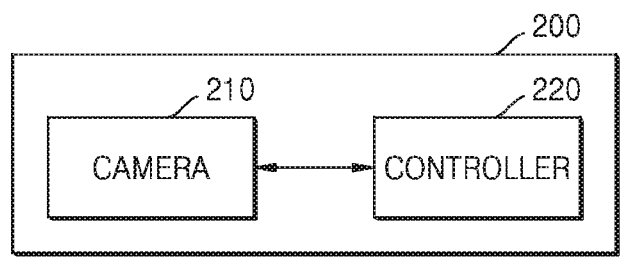
FIG. 6 illustrates an electronic device according to an exemplary embodiment.

FIG. 6 illustrates an electronic device according to an exemplary embodiment.

Referring to FIG. 6, the electronic device 200 may include a camera 210 and a controller 220. The electronic device 200 may include the controller 220, but not the camera 210, and the electronic device 200 may obtain an image including the 2D color code from another device which captures the 2D color code. That is, the camera 210 may be a component of the other device rather than the electronic device 200.

The camera 210 may perform an operation to obtain an image including the 2D color code. The camera 210 may obtain an image including the 2D color code, the image being displayed by the displaying device. The camera 210 may capture an image including the 2D color code to obtain the 2D color code. The controller 220 may obtain an image including the 2D color code from the camera 210. As described above, the electronic device 200 may include the controller 220, but not the camera 210, and the controller 220 may obtain an image including the 2D color code from another device which captures the 2D color code. An image including the 2D color code may be comprised of a plurality of pixels, each of which has a pixel value. The camera 210 may capture the 2D color code displayed by the displaying device.

The camera 210 may include photo diodes which have sensitivity corresponding to three colors of RGB, and a photoelectric conversion may be performed by the photo diodes on a signal light generate by the displaying device 100 to obtain an intensity (R, G, B) of received light.

When the displaying device displays the 2D color code as a video, the camera 210 may capture the displayed video on a video at a frame rate which amounts to at least a frame rate of the displayed video, and obtain individual frame images of the displayed video. Therefore, the camera 210 may obtain a plurality of continuous frame images.

An image including the 2D color code may have the 2D color code overlaid on a background image.

The controller 220 controls overall operations of the electronic device 200. For example, the controller 220 may include at least one processor, a CPU, a micro processor, or a GPU, but is not limited thereto. The controller 220 may include a plurality of modules, and each module may perform at least one function or at least one operation.

The electronic device 200 may further include a memory for storing a program, one or more instructions, or data. The controller 220 may perform an operation according to the program, instructions, or data. At least one processor included in the controller 220 may be coupled to the memory and configured to execute the one or more instructions stored in the memory.

The controller 220 may detect the base cells in an image including the 2D color code. The controller 220 may detect the 2D color code in an image including the 2D color code based on the detected based cells.

The controller 220 may detect the base cells in an image including the 2D color code based on information regarding the base cells. The information regarding the base cells may represent at least one from among the first figure, the second figure and colors of the base cells, and locations of the base cells in the 2D color code. The memory of the electronic device 200 may store the information regarding the base cells.

The controller 220 may detect the 2D color code in an image including the 2D color code based on the detected based cells. The controller 220 may decode colors of the data cells included in the 2D color code to obtain data. The decoding may be referred to as deciphering. For example, the controller 220 may recognize and convert chromaticity of each data cell into an x-coordinate value and a y-coordinate value on chromaticity coordinates. The controller 220 may obtain the chromaticity of each data cell as a value of (R, G, B) and then convert the value of (R, G, B) to (x, y) on the chromaticity coordinates by using Equation 1. (x, y) may be referred to as a reception symbol. The controller 220 may determine a data symbol close to the reception symbol among data symbols specified on the chromaticity coordinates. The controller 220 may determine a bit string which is assigned to the determined data symbol as decoded data. Other data decoding methods may be used to decode colors of the data cells.

An explanation of detecting base cells in an image including a 2D color code is given below by referring to FIGS. 7, 8, 9, and 10.

Figure 7:
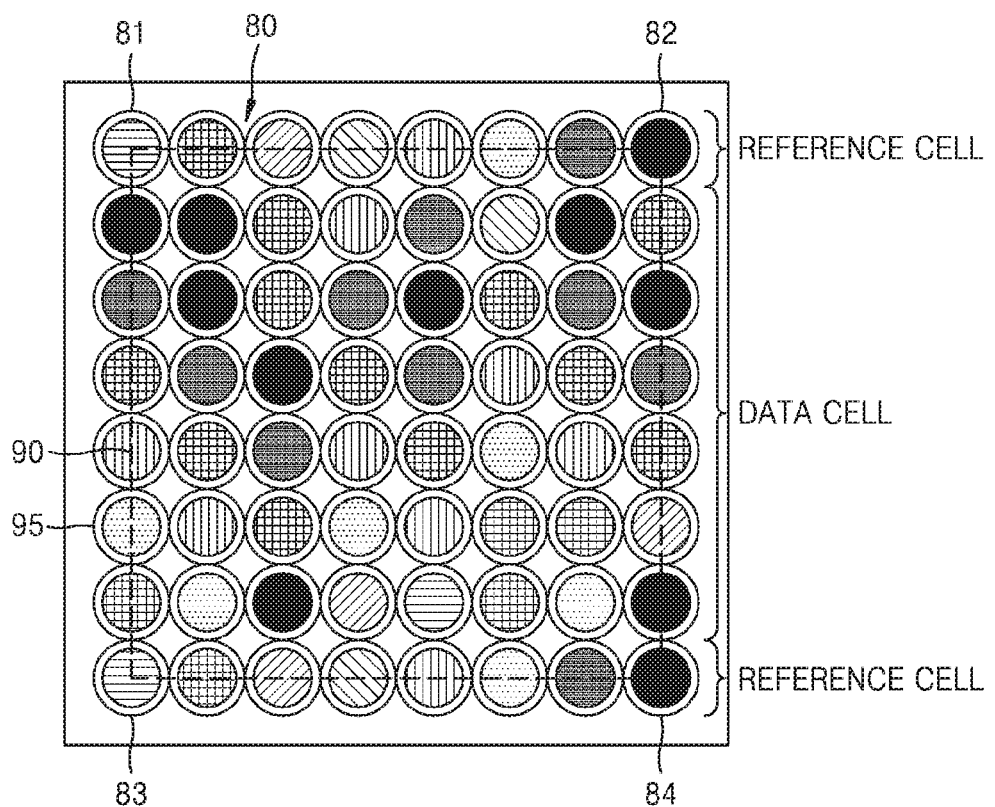
FIG. 7 illustrates a 2D color code according to an exemplary embodiment.

FIG. 7 illustrates a 2D color code according to an exemplary embodiment. An explanation of a 2D color code is described in FIGS. 1, 2, and 3, thus redundant explanations will be omitted.

In FIG. 7, cells along first and eighth lines of a 2D color code 80 represent reference cells, and cells along second and seventh lines represent data cells. Base cells 81, 82, 83, and 84 are located on four corners of the 2D color code. That is, some of the reference cells represent the base cells 81, 82, 83, and 84. Unlike FIG. 3, eight types of the reference cells are used in the 2D color code 80 in FIG. 7. That is, eight types of reference colors are used. Each color of the cells are schematically illustrated by different hatching in FIG. 7. The reference colors and data colors are the same in FIG. 7. Reference symbols on chromaticity coordinates may be the same as data symbols corresponding to the data cells.

Referring to FIG. 6, the camera 210 of the electronic device 200 may obtain an image including the 2D color code 80 of FIG. 7.

The controller 220 may detect outlines 95 in the image including the 2D color code 80. Among objects identified by the outlines 95, the base cells 81, 82, 83, and 84 may be detected based on a first figure which is a figure of the base cells 81, 82, 83, and 84, colors of the base cells 81, 82, 83, and 84, and a second FIG. 90 having vertices at the base cells 81, 82, 83, and 84.

An explanation of each operation performed by the controller 220 is given below.

Detection of Outlines

The controller 220 may detect the outlines 95 in the image including the 2D color code 80 by performing an image process on the image. The controller 220 may convert the image including the 2D color code 80 to a component image based on a certain component, convert the component image to a binary image based on a threshold value, and then detect the outlines 95 in the binary image. However, this method is merely described as an example, and other methods to detect outlines may be used.

An explanation of a method used by the controller 220 to obtain a component image is given below. The component image is generated by adjusting an original image based on a certain component, such as luminance, brightness, saturation, red color component, blue color component, or green color component. The certain component may be a component which is appropriate to identify pixel values of the outlines 95 of the base cells 81, 82, 83, and 84 from pixel values of a background image, or appropriate to identify pixel values of the outlines 95 of the base cells 81, 82, 83, and 84 from pixel values of an inside of the base cells 81, 82, 83, and 84. That is, a difference between the pixel values of the outlines 95 of the base cells 81, 82, 83, and 84 and the pixel values of the background image or a difference between the pixel values of the outlines 95 of the base cells 81, 82, 83, and 84 and the pixel values of the inside of the base cells 81, 82, 83, and 84 in the component image may be bigger than differences in the original image. Therefore, the controller 220 may generate a component image to increase the differences so that the outlines 95 may be extracted accurately.

The base cells 81, 82, 83, and 84 may have borderlines 95 of a color different from their inner color. The controller 220 may generate a component image where difference between pixel values of the base cells 81, 82, 83, and 84 (that is, pixel values of an inside of the borderline 95 of the base cells 81, 82, 83, and 84) and pixel values of the borderlines 95 of the base cells 81, 82, 83, and 84 are bigger than differences in the original image. For example, when each cell has a white borderline 95, a luminance component image which is based on luminance may be used.

Luminance components may be obtained based on Y components in a YUV image, and may be obtained from an RGB image based on conversion using a weighted average method. When colors of the base cells 81, 82, 83, and 84 are green or red, a blue component image may be used since the borderlines 95 are white. A plurality of component images may be used in parallel, and a component image may be determined based on a result of detection.

Figure 8:
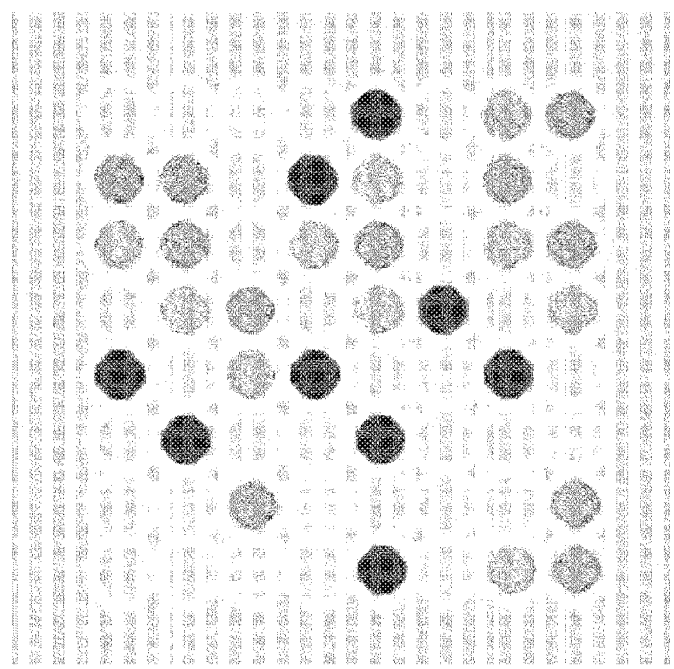
FIG. 8 illustrates an example component image.

FIG. 8 illustrates an example component image. According to an exemplary embodiment, the controller 220 of FIG. 6 generates a component image based on a luminance component and an image including the 2D color code 80 of FIG. 7.

The controller 220 may convert the component image to a binary image based on a threshold.

Figure 9:
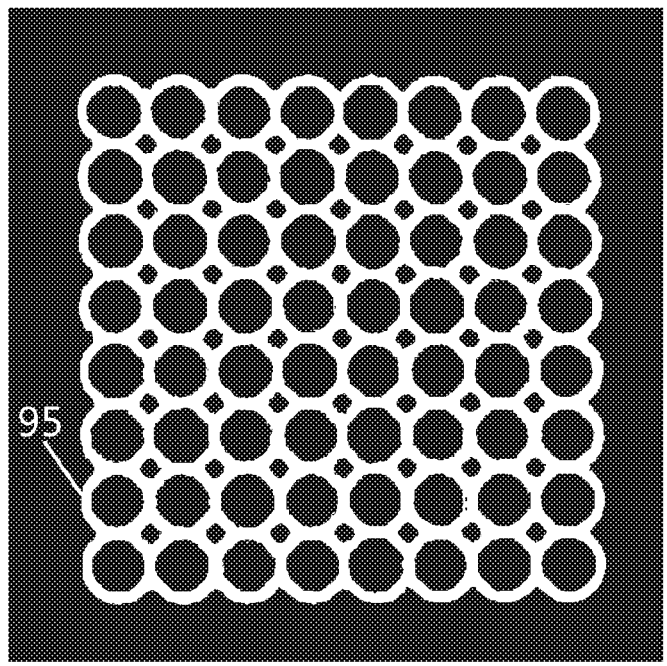
FIG. 9 illustrates an example binary image.

FIG. 9 illustrates an example binary image generated based on the component image illustrated in FIG. 8 by the controller 220 of FIG. 6.

Referring to FIG. 9, the difference between pixel values around the outlines 95 in the binary image are dramatic.

The controller 220 may detect the outlines 95 in the binary image. In order to detect outlines in a binary image, other disclosed methods may be used.

Figure 10:
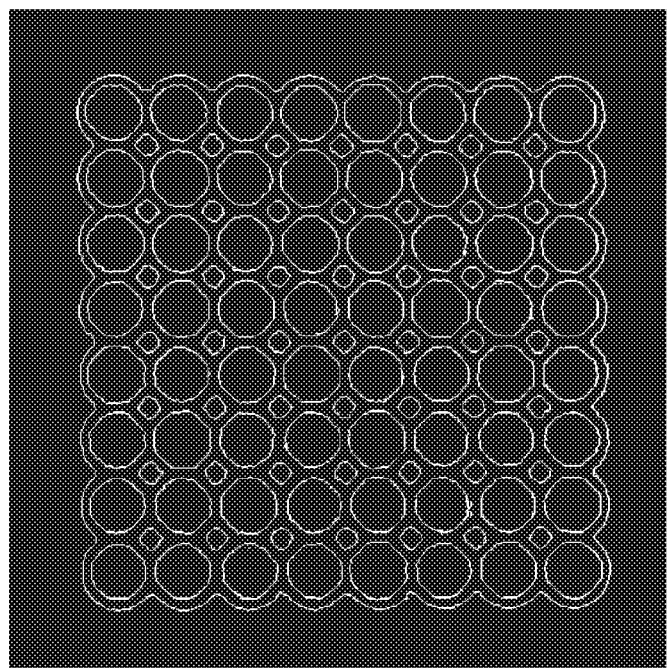
FIG. 10 illustrates an example outline detected in an image including a 2D color code.

FIG. 10 illustrates an example outlines detected in an image including a 2D color code. FIG. 10 illustrates outlines detected in the binary image of FIG. 9 by the controller 220 of FIG. 6.

The controller 220 may generate a component image and a binary image based on an image including the 2D color code 80 captured by the camera 210, and then detect the outlines 95 in the binary image. Thus, the outlines 95 of the base cells 81, 82, 83, and 84 may be detected accurately.

When the camera 210 captures the 2D color code 80 on a video, the camera 210 may obtain a plurality of frame images. When the camera 210 captures the 2D color code 80 on a video, a location of the camera 210 may be fixed or not change much. Therefore, a location of the 2D color code 80 in each frame image may be fixed or not change much. When the controller 220 detects outlines 95 in frame images, a region where outlines 95 are detected in frame images may be limited based on locations of the base cells 81, 82, 83, and 84 detected in previous frame images. That is, the controller 220 may detect the outlines 95 in frame images based on the base cells 81, 82, 83, and 84 in the previous frame image. Therefore, the controller 220 may not analyze a whole region of each frame image for detecting the outlines 95, and may limit a region for detecting the outlines 95 in frame images. Accordingly, a load on the controller 220 may decrease.

Detection of Base Cells

The controller 220 may detect a plurality of objects which are identified by the outlines 95 detected in an image including the 2D color code 80. The controller 220 may extract objects which are estimated as the base cells 81, 82, 83, and 84 from among the plurality of objects. The controller 220 may extract objects having a first figure with a same color with a base cell from among the plurality of objects The controller 220 may determine whether a figure of an object whose outline 95 is detected in an image including the 2D color code 80 corresponds to a figure of the base cells 81, 82, 83, and 84, that is, a first figure of the base cells 81, 82, 83, and 84.

When the first figure is circular, the controller 220 may determine whether a figure of an object whose outline 95 is detected is circular. The controller 220 may obtain maximum and minimum distances between a center point of the object and points along the outline 95 of the object, and may determine that a figure of the object is circular when a difference between the maximum and minimum distances is within a predetermined range. When the difference between the maximum and minimum distances is not within a predetermined range, the controller 220 may determine that a figure of the object is not circular. A ratio of the maximum and minimum distances may be equal to 1 when a figure of the object is circular. However, when the 2D color code 80 is displayed by a displaying device, an image including the 2D color code may be captured by the camera 210 which is not directly facing the 2D color code, so the 2D color code in the captured image may appear askew. Here, the base cells 81, 82, 83, and 84 may have figures close to an ellipse in the image including the 2D color code 80. Therefore, the controller 220 may determine whether a figure of the object is circular when the ratio of the maximum and minimum distances is close to 1.

According to the above method, a load for determining whether a shape of an object is circular may be reduced. The controller 220 may employ other methods such as ellipse fitting method using least-squares method, or Hough Transformation to determine a figure of an object.

Figure 11:
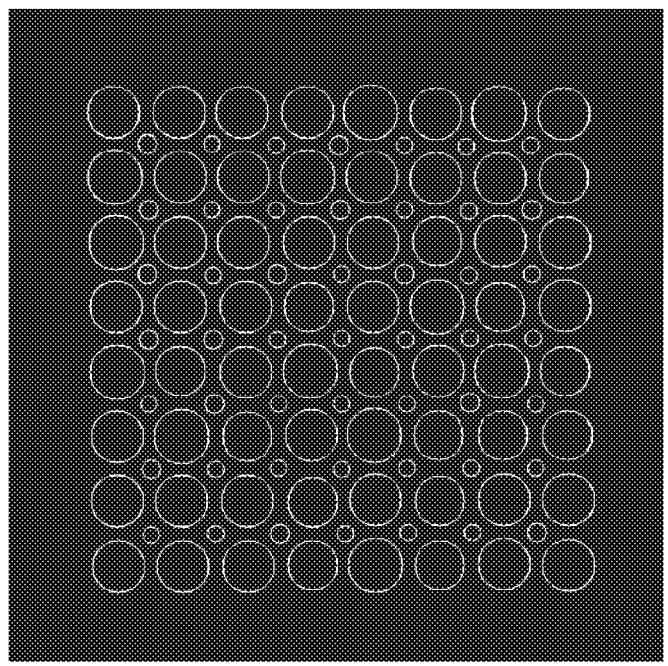
FIG. 11 illustrates example objects having same figures as base cells.

FIG. 11 illustrates example objects having same figures as base cells. FIG. 11 illustrates objects corresponding to a first figure of base cells which are detected based on the outlines of FIG. 10 by the controller 220 of FIG. 6.

The controller 220 may determine whether a color of an object whose outlines are detected in an image including the 2D color code 80 corresponds to colors predetermined for the base cells 81, 82, 83, and 84, that are, base colors. Here, colors in an image including the 2D color code 80 captured by the camera 210 may be targets of color determination. The controller 220 may perform color determination on an object having a first figure among objects whose outlines are detected. For example, when colors predetermined for the base cells 81, 82, 83, and 84 are green and red, the controller 220 may determine whether a color of the object is green or red.

Further, it may be determined that a color of an object close to colors predetermined for the base cells 81, 82, 83, and 84 to a certain extent corresponds to the colors predetermined for the base cells 81, 82, 83, and 84.

The controller 220 may extract objects having a first figure and a base color corresponding to colors predetermined for the base cells 81, 82, 83, and 84.

The controller 220 may extract a combination of objects which are located at vertices of a second figure from objects having a first figure and a base color, the second figure having vertices at the base cells 81, 82, 83, and 84.

The number of the base cells 81, 82, 83, and 84 in the 2D color code 80 of FIG. 7 is four, and a second FIG. 90 having vertices at the base cells 81, 82, 83, and 84 is rectangular. Colors of two base cells 81 and 83 corresponds to a first base color (illustrated using hatching with horizontal lines, for example, green), and colors of other base cells 82 and 84 correspond to a second base color (illustrated in solid black, for example, red).

Based on the 2D color code 80 of FIG. 7, the controller 220 may select two objects having the first base color and two objects having the second base color from among objects having the first figure and base colors, and then determine whether a figure having vertices at the selected four objects is rectangular (the second figure).

Figure 12:
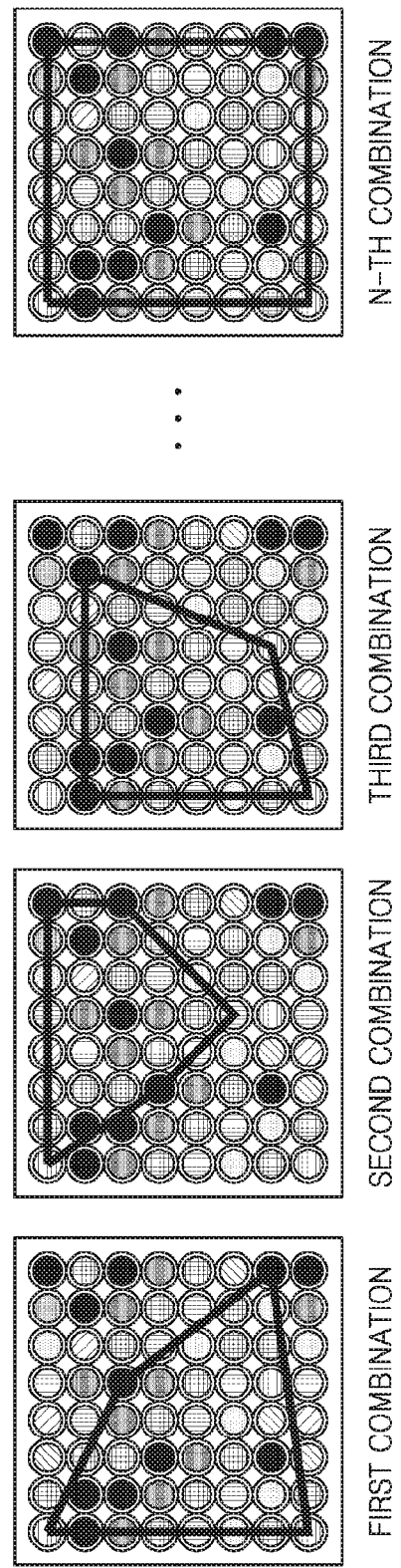
FIG. 12 illustrates an example method of extracting a combination of objects having a second figure when using the 2D color code of FIG. 7.

FIG. 12 illustrates an example method of extracting a combination of objects having a second figure when using the 2D color code of FIG. 7.

Referring to FIG. 12, the controller 220 may select two objects having the first base color and two objects having the second base color from among objects having the first figure and base colors to extract a combination of the objects. As illustrated in FIG. 12, the controller 220 may extract a plurality of combinations such as combination 1, combination 2, . . . , and combination N. The controller 220 may determine a figure (which is illustrated by a bold line) represented by objects of each of the combinations. The controller 220 may extract a combination (e.g., combination N) of objects representing a figure which corresponds to the second figure (e.g., a rectangular figure). The controller 220 may select a combination (e.g., combination N) of objects representing the second figure from among the combinations (e.g., combination 1, combination 2, . . . , and combination N). The controller 220 may initially determine a figure represented by objects which are located the furthest from a center of the 2D color code. For example, when there are two combinations of objects representing the second figure (e.g., a rectangular figure) among a plurality of combinations (e.g., combination 1, combination 2, . . . , and combination N), a combination of objects which are located further from a center of the 2D color code may be selected by the controller 220. Therefore, a load on the controller 220 may be reduced.

When the second figure is rectangular, a characteristic of a line along the two green base cells 81 and 83 and a line along the other red base cells 82 and 84 being parallel may be used. The controller 220 may examine whether the line along the two green base cells 81 and 83 and the line along the two red base cells 82 and 84 are parallel or how parallel they are. However, when the 2D color code is displayed by the displaying device 100, an image including the 2D color code may be captured by the camera 210 which is not directly facing the 2D color code, so the 2D color code in the captured image may appear askew. Therefore, it may be determined that two lines are parallel even if the two lines are not exactly parallel. The controller 220 may extract a combination of four objects representing the second figure.

As described above, when the camera 210 captures the 2D color code 80 on a video, a location of the camera 210 may be fixed or not change much. Therefore, sizes of base cells 81, 82, 83, and 84 in each frame image may be fixed or not change much. When the controller 220 extracts a combination of objects from among candidate groups of the base cells 81, 82, 83, and 84 in frame images, the controller 220 may extract a combination of objects having sizes within a predetermined range from sizes of the base cells 81, 82, 83, and 84 in a previous frame image. Therefore, a load on the controller 220 may be reduced by limiting objects to be analyzed.

When a location of the camera 210 is fixed or not change much, sizes of the second figure may be estimated to be uniform in a plurality of frame images. Therefore, the controller 220 may limit a combination of objects based on a size of the second figure in a previous frame image. Therefore, a load on the controller 220 may be reduced by limiting combinations to be analyzed.

The controller may detect the 2D color code in an image including the 2D color code based on the extracted combination of objects. The electronic device may detect the 2D color code 80 based on a location of the extracted combination of objects in the image. The extracted combination of objects represents objects which are estimated as base cells. Since locations of the base cells 81, 82, 83, and 84 in the 2D color code 80 may be predetermined, the base cells 81, 82, 83, and 84 may be detected in the image based on the locations of the 2D color code 80.

When the camera 210 does not directly face the 2D color code 80 and captures the 2D color code 80, adjustment to the 2D color code 80 included in an image may be performed. For example, an affine transformation may be performed before the controller 220 detects the 2D color code in an image.

The controller 220 may obtain colors of data cells located within a group of cells which are obtained from an image including the 2D color code, and decode colors to generate corresponding data.

The controller 220 may confirm whether an extracted combination of objects corresponds to the base cells 81, 82, 83, and 84. In order to confirm whether an extracted combination of objects corresponds to the base cells 81, 82, 83, and 84, the controller 220 may analyze validity of the extracted combination of the objects.

The controller 220 may determine validity of the extracted combination of the objects. The controller 220 may detect the 2D color code 80 in an image including the 2D color code 80 based on the combination which is determined to be valid. That is, by determining the validity, the 2D color code 80 may be detected accurately in the image including the 2D color code 80. The controller 220 may determine the validity of the combination of the extracted objects by using reference cells included in the 2D color code 80.

After the controller 220 of the electronic device 200 detects the 2D color code 80 in the image, color adjustment may be performed based on the reference cells. When perceived colors of the reference cells are different from known colors of the reference cells, the controller 220 may offset such a difference to obtain colors of data cells included in the 2D color code. The controller 220 may decode colors of the data cells to obtain corresponding data.

The controller 220 may not determine validity of an extracted combination of objects. When the 2D color code 80 does not include reference cells, the controller 220 may skip determination of validity.

An explanation of an exemplary method of determining validity of a combination of objects by the controller 220 is given below.

Determination of Validity

The controller 220 may determine whether pixel values of pixels where reference cells are estimated to be located satisfy a predetermined condition which is satisfied by a reference cell group, and such estimation may be performed based on a location of an extracted combination of objects The reference cell group may have a certain location relation with respect to base cells. An extracted combination of objects may represent candidates for the base cells. Reference cells estimated according to the location of the extracted combination of the objects may be referred to as candidates for the reference cells.

The controller 220 may determine validity of the candidates for the reference cells based on colors of the candidates for the reference cells and known colors of the reference cells When a difference between the colors of the candidates for the reference cells and the reference cells is less than a certain value, the controller 220 may determine that the candidates are valid.

The controller 220 may determine whether pixel values of pixels where a reference cell group is estimated to be located satisfy a predetermined condition which is satisfied by the actual reference cell group.

When the pixel values of the pixels where a reference cell group is estimated to be located satisfy the predetermined condition, it may be determined to be valid. The predetermined condition may be with respect to a characteristic defined by a color arrangement of the reference cell group.

The controller 220 may extract four objects, and perform an affine transformation on the four objects before determination of validity in FIG. 7.

The controller 220 may perform determination of validity based on calculating a correlation coefficient between a chromaticity arrangement of the actual reference cell group and a chromaticity arrangement specified by pixel values of pixels where a reference cell group is estimated to be located.

Such determination of the controller 220 may be performed as described below. The controller 220 may sample rectilinearly pixel values of pixels where reference cells are estimated to be located to obtain a certain number of sampled values, such estimation being performed based on a location of an extracted combination of object. The certain number of the sampled values may be larger than a number of reference cell groups. When obtaining the sampled values, an affine transformation may be performed for adjustment of an image.

When reference cells have a gap therebetween in a 2D color code, sampling at a uniform distance may cause reduced accuracy since pixel values at an edge of a cell or a background are also sampled. Therefore, in order to sample colors inside reference cells, a gap between the reference cells may be skipped when sampling. A gap between base cells and a gap between reference cells may be predetermined, and the controller 220 may calculate these gaps in an image.

For example, the controller 220 may obtain 256 samples a0 through a255. The controller 220 may measure chromaticity of the 256 samples. Methods of measuring chromaticity may vary according to exemplary embodiments. The controller 220 may convert the measured chromaticity of each sample to values of x and y coordinates. For example, the controller 220 may convert chromaticity of a sample a0 to (x0, y0), a sample a1 to (x1, y1), and sample a255 to (x255, y255).

Chromaticity of samples a0 through a255 is recognized chromaticity by the electronic device 200, and may be referred to as recognized chromaticity. Even if pixel values of reference cells are selected as samples, the samples may not coincide with actual chromaticity of reference cells in a 2D color code generated by the displaying device 100.

The electronic device 200 may prestore actual chromaticity of reference cells. By evaluating a correlation between recognized chromaticity and actual chromaticity of samples a0 through a255, whether reference cells are located at pixels which are estimated according to an extracted combination of objects may be determined. When reference cells are located at the estimated pixels, i.e., when a correlation coefficient is bigger than a predetermined threshold, the reference cells may be determined to be valid.

A correlation may be evaluated based on Equations 2 through 4, described below. The correlation is represented by indices, and such indices may include (a) correlation coefficient of x and/or y coordinate(s). Equation 2 is used to calculate a correlation coefficient Cx of the x coordinate of chromaticity, Equation 3 is used to calculate a correlation coefficient Cy of the y coordinate of chromaticity, and Equation 4 is used to calculate the average Ck of a correlation coefficient of x and y coordinates. According to an exemplary embodiment, Equation 4 may be used as an evaluation function and the average Ck may be used as an overall correlation coefficient.

Equation 2

$$C_x = \frac{\sum_{i=1}^{n}(x_i - \bar{x})(X_i - \bar{X})}{\sqrt{\sum_{i=1}^{n}(x_i - \bar{x})^2}\sqrt{\sum_{i=1}^{n}(X_i - \bar{X})^2}}, -1 \leq C_x \leq 1 \quad (2)$$

Equation 3

$$C_y = \frac{\sum_{i=1}^{n}(y_i - \bar{y})(Y_i - \bar{Y})}{\sqrt{\sum_{i=1}^{n}(y_i - \bar{y})^2}\sqrt{\sum_{i=1}^{n}(Y_i - \bar{Y})^2}}, -1 \leq C_y \leq 1 \quad (3)$$

Equation 4

$$C_k = \frac{C_x + C_y}{2}, -1 \leq C_k \leq 1 \quad (4)$$

Here, $x_i$ and $y_i$ represent recognized chromaticity of a sample ai, and $X_i$ and $Y_i$ represent actual chromaticity of the sample ai,
$\bar{x}$ represents an average of xi,
$\bar{X}$ represents an average of Xi,
$\bar{y}$ represents an average of yi,
$\bar{Y}$ represents an average of Yi, and, $-1 \leq C_k \leq 1$.

A correlation may be represented by other indices, and is not limited to correlation coefficients Cx, Cy, and Ck. For example, correlation coefficients Cx and Cy are normalized indices, and indices which are not normalized (e.g., without denominators in Equations 2 and 3) may be used for the correlation.

The controller 220 may perform determination of validity based on comparing a characteristic of a frequency spectrum of an actual reference cell group and a characteristic of a frequency spectrum obtained by frequency analysis of chromaticity which is specified from pixel values of pixels where a reference cell group is estimated to be located.

For example, the controller 220 may perform a determination of validity as described below. The controller 220 may perform frequency analysis such as Fast Fourier Transformation (FFT) on obtained samples. By performing the frequency analysis, the controller 220 may obtain information regarding the number of repetitions of a same color in a reference cell group. A plurality of reference cells of a reference cell group may be arranged in a line with a predetermined color, and a certain order of arrangement may be repeated in the line. By performing the frequency analysis, whether reference cells are located at pixels that are estimated based on an extracted combination of objects may be determined.

The controller 220 may perform the determination of validity based on calculating a distance between an estimated location and an actual location of a reference cell group on chromaticity coordinates.

For example, the controller 220 may perform such determination of validity as below. The controller 220 may measure chromaticity of samples a0 through a255, and convert recognized chromaticity to values of x and y coordinates. For example, chromaticity of samples a0, a1, and a255 are respectively converted to $(x_0, y_0)$, $(x_1, y_1)$, and $(x_{255}, Y_{255})$. The controller 220 may obtain actual chromaticity of reference cells in advance.

The controller 220 may calculate indices representing distances between recognized chromaticity and actual chromaticity of the samples. Here, a sum of the distances between recognized chromaticity and actual chromaticity of the samples is represented by Dk. Other indices may be used to represent the distance between recognized chromaticity and actual chromaticity of the samples. For example, an average of the distance $D_k/n$ may be used.

Equation 5

$$D_k = \sum_{i=1}^{n} \sqrt{(x_i - X_i)^2 + (y_i - Y_i)^2} \quad (5)$$

Here, $x_i$ and $y_i$ represent recognized chromaticity of a sample ai, and $X_i$ and $Y_i$ represent actual chromaticity of the sample ai. When the distance of a sample is lower than a predetermined threshold, the sample may be determined to be valid.

Figure 13:
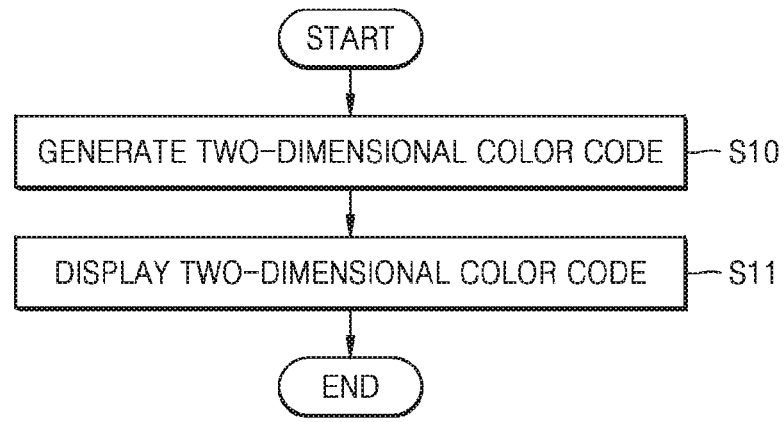
FIG. 13 illustrates a flowchart of an operation of a displaying device, according to an exemplary embodiment.

FIG. 13 illustrates a flowchart of an operation of a displaying device, according to an exemplary embodiment.

Referring to FIG. 13, the displaying device may generate a 2D color code including base cells and data cells in operation S10. The displaying device may display the 2D color code in operation S11.

The 2D color code may further include reference cells. A method of FIG. 12 may be performed by the displaying device 100 as described above. Therefore, an explanation of operation S10 where the displaying device generates the 2D color code is omitted. FIGS. 2, 3, and 7 respectively illustrate example 2D color codes 20, 50, and 80 generated by the displaying device.

Figure 14:
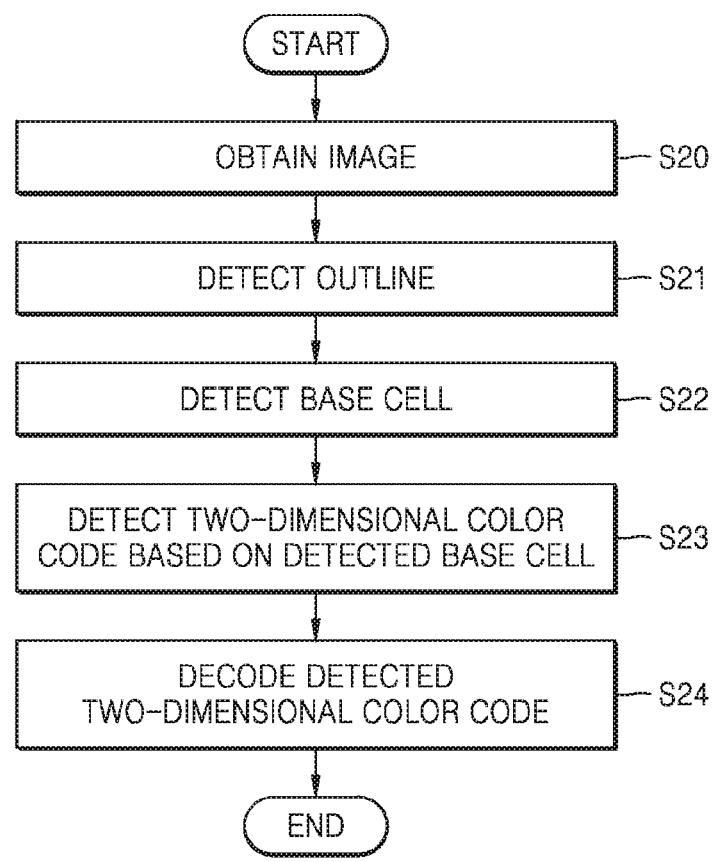
FIG. 14 illustrates a flowchart of an operation of an electronic device, according to an exemplary embodiment.

FIG. 14 illustrates a flowchart of an operation of an electronic device, according to an exemplary embodiment.

Referring to FIG. 14, the electronic device may obtain an image including the 2D color code in operation S20. The electronic device may obtain image including the 2D color code by capturing the displaying device which is displaying the 2D color code.

The electronic device may detect outlines in the image including the 2D color code in operation S21. The electronic device may detect base cells from among objects identified by the outlines in the image in operation S22. The electronic device may detect the 2D color code in the image based on the detected base cells in operation S23. The electronic device may decode the detected 2D color code to obtain data in operation S24. That is, the electronic device may decode colors included in the 2D color code to obtain data.

The method of FIG. 14 may be performed by the electronic device 200 as described above. Therefore, an explanation of each operation performed by the electronic device is omitted.

Figure 15:
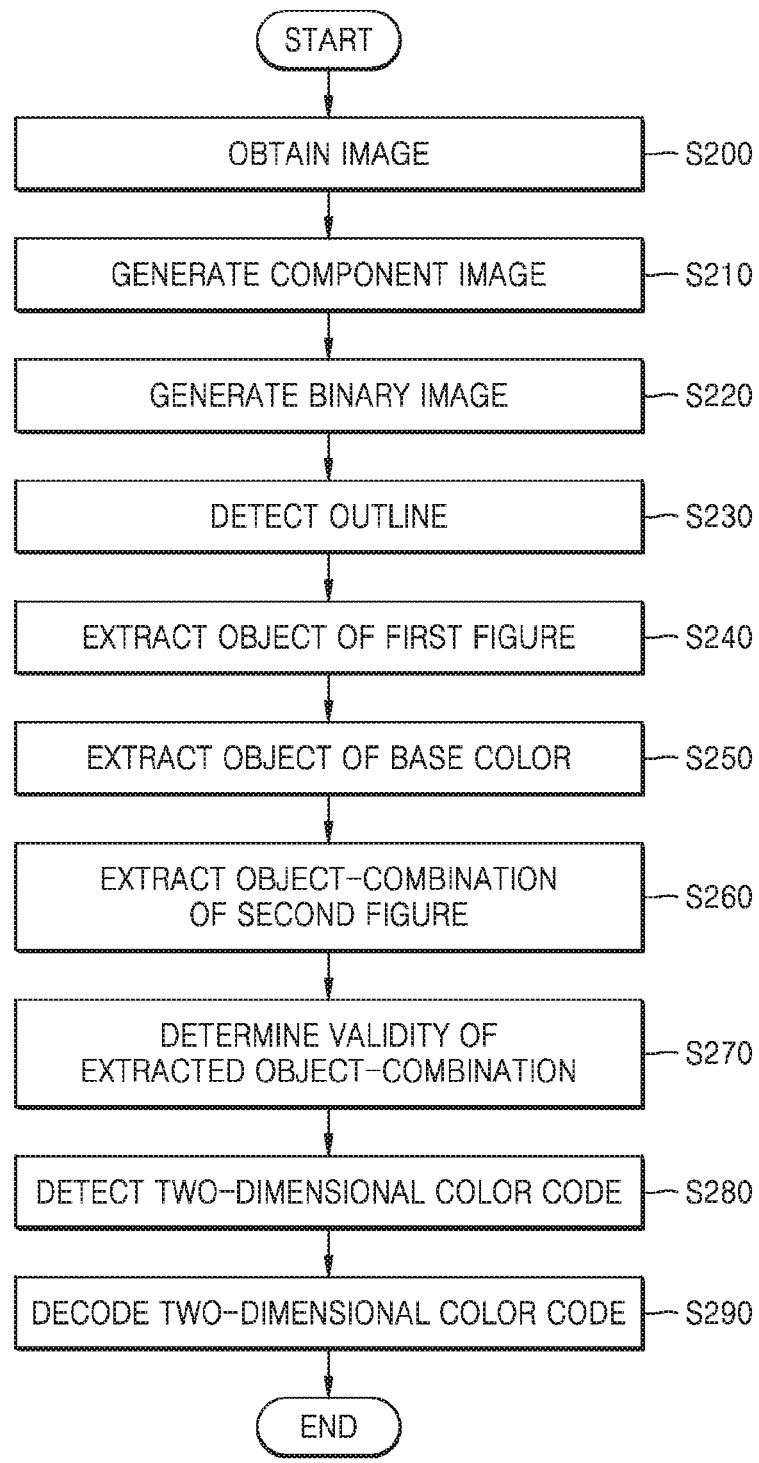
FIG. 15 illustrates a flowchart of an operation of an electronic device, according to an exemplary embodiment.

FIG. 15 illustrates a flowchart of an operation of an electronic device, according to an exemplary embodiment.

Referring to FIG. 14, the electronic device may obtain an image including the 2D color code in operation S200. The electronic device may generate a component image by extracting a certain component from the image including the 2D color code in operation S210. The electronic device may convert the component image to a binary image based on a threshold in operation S220. FIGS. 8 and 9 respectively illustrate an example component image and an example binary image. A difference between pixel values around outlines in the binary image may be dramatic.

The electronic device may detect the outlines in the binary image in operation S230. The electronic device may extract objects corresponding to a first figure from among objects identified by the detected outline in operation S240, the first figure being a figure of base cells. When the first figure is circular, the electronic device may determine whether each figure of the objects identified by the outlines is circular, and may extract circular objects from among the identified objects.

The electronic device may extract objects which have a color that is the same as base colors from among the objects corresponding to the first figure in operation S250. The electronic device may determine whether each color of the objects corresponding to the first figure is the same as the base colors. Accordingly, the electronic device may extract objects which have the first figure and the base colors.

The electronic device may extract a combination of objects representing a second figure from among the extracted objects in operation S260. The electronic device may extract a combination of objects representing vertices of the second figure from combinations of objects which have the first figure and the base colors.

The electronic device may determine validity of the extracted combination of the objects which represent the second figure in operation S270. In operation S260, when a plurality of combinations of objects are extracted, validity of each combination may be determined.

The electronic device may determine a combination whose validity is determined as base cells, and then detect the 2D color code based on the determined base cells in operation S280. The electronic device may decode the detected 2D color code to obtain data in operation S290.

Figure 16:
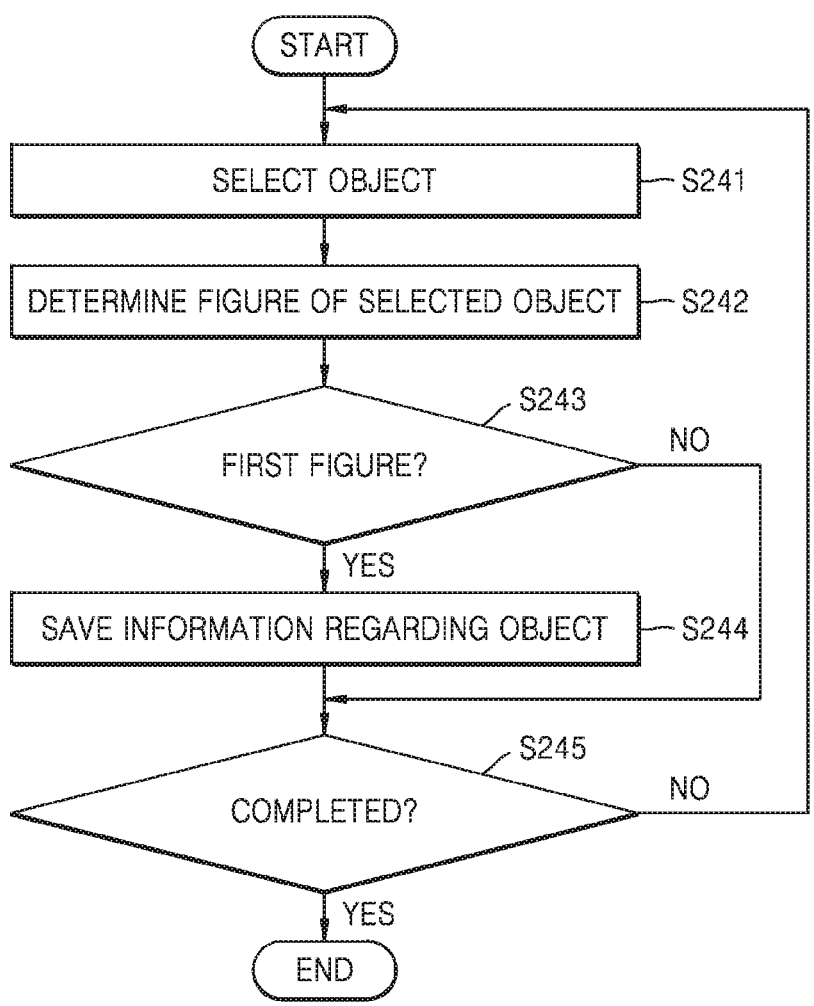
FIG. 16 illustrates a flowchart of a method of extracting objects with a first figure of base cells, according to an exemplary embodiment.

FIG. 16 illustrates a flowchart of a method of extracting objects with a first figure of base cells, according to an exemplary embodiment. FIG. 16 illustrates operation S240 of FIG. 15 in detail.

Referring to FIG. 16, the electronic device may select an object from among objects identified by outlines which are detected in an image including a 2D color code in operation S241. The electronic device may determine a figure of the object in operation S242. The electronic device object may determine whether the figure of the object is a figure (first figure) of base cells in operation S243. When the figure of the object is the first figure, the electronic device may store information regarding the object determined to have the first figure in operation S244. For example, the electronic device may store coordinates of a center of the object in the image.

The electronic device may determine whether determination of figures of all the objects identified by the detected outlines is completed in operation S245. When it is not completed, the electronic device may return to operation S241, select another object from among objects and repeat the determination of figures.

Accordingly, the electronic device may extract objects of the first figure from among objects identified by outlines.

Figure 17:
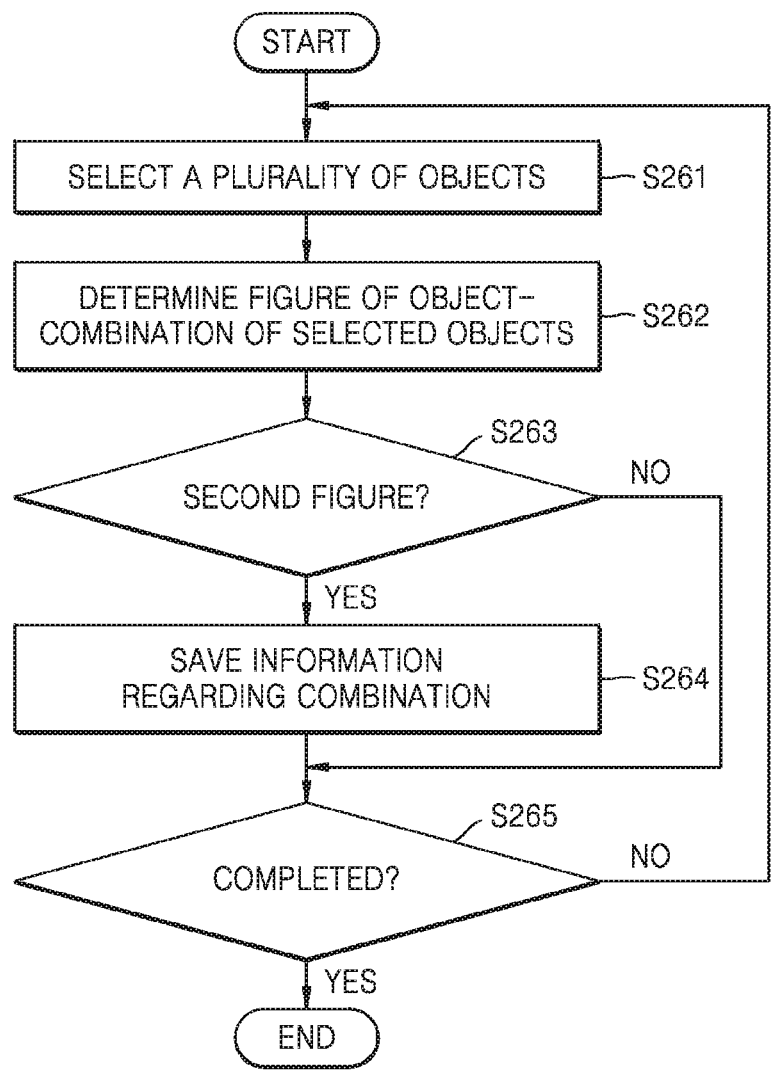
FIG. 17 illustrates a flowchart of a method of extracting a combination of objects, according to an exemplary embodiment.

FIG. 17 illustrates a flowchart of a method of extracting a combination of objects, according to an exemplary embodiment. FIG. 17 illustrates operation S260 of FIG. 15 in detail.

Referring to FIG. 17, the electronic device may select a certain number of objects from extracted objects, the certain number being equal to the number of the base cells in operation S261. That is, the electronic device may select a combination of objects from among the extracted objects. The electronic device may obtain the number of the base cells in a 2D color code based on information regarding base cells.

The electronic device may determine a figure represented by the selected objects in operation S262. The electronic device may specify the figure which has vertices at the selected objects.

The electronic device may determine whether the figure represented by the selected objects is the second figure in operation S263. When the figure represented by the selected objects is the second figure, the electronic device may store information regarding the selected objects representing the second figure in operation S264.

The electronic device may determine whether figures of all the combinations of objects are determined in operation S265. When it is not completed, the electronic device may return to operation S261, select another combination of objects and repeat the determination of figures.

Figure 18:
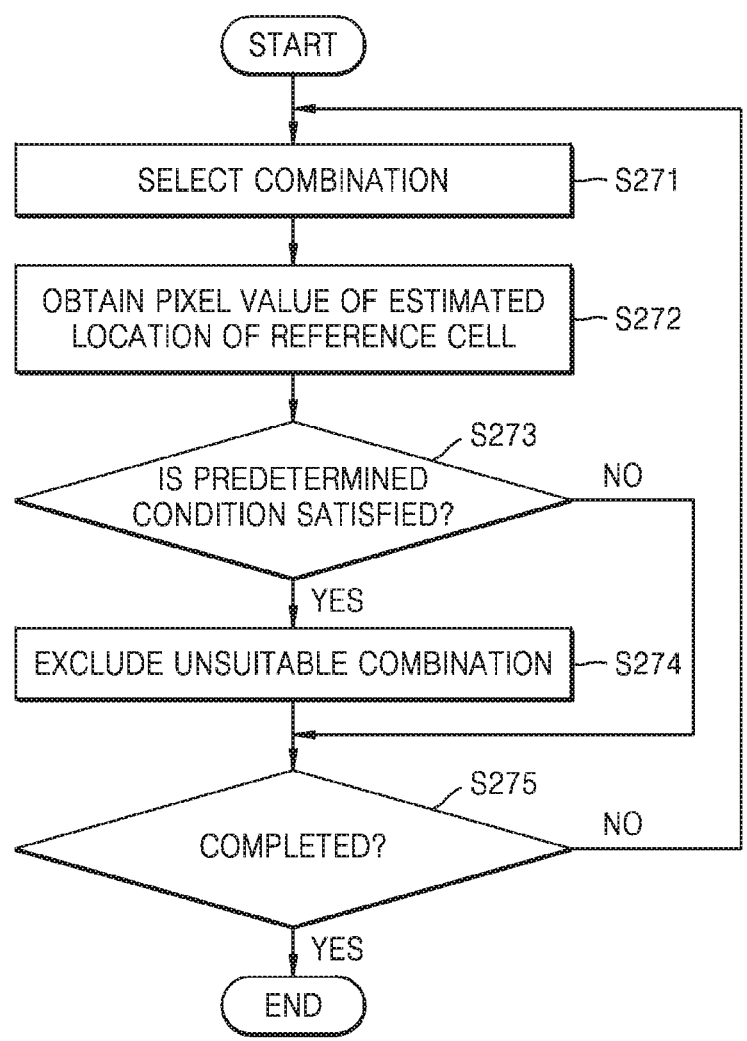
FIG. 18 illustrates a flowchart of a method for analyzing validity of an extracted combination of objects, according to an exemplary embodiment.

FIG. 18 illustrates a flowchart of a method of analyzing validity of an extracted combination of objects, according to an exemplary embodiment. FIG. 18 illustrates operation S270 of FIG. 15 in detail.

The electronic device may select a combination of objects representing the second figure in operation S271. In operation S260 of FIG. 15, when a plurality of combinations of objects are extracted, the electronic device may select a combination from among the plurality of combinations.

The electronic device may take the objects included in the selected combination as candidates for the base cells, and may obtain pixel values of pixels where reference cells are estimated to be located in the image including the 2D color code according to a location of each object in operation S272.

The electronic device may determine whether pixel values of pixels where reference cells are estimated to be located satisfies a predetermined condition which is satisfied by a reference cell group in operation S273. When the predetermined condition is not satisfied, the electronic device may determine the selected combination as not corresponding to base cells in operation S274.

The electronic device may determine whether validity of all the combinations of objects extracted in operation S260 is completed in operation S274. When it is not completed, the electronic device may return to operation S271, select another combination of objects and repeat the determination of validity.

According to an exemplary embodiment, base cells included in a 2D color code may have a borderline with a color different to a color of insides of the base cells, and there may be no borderline surrounding the 2D color code. The electronic device may detect base cells in an image including the 2D color code, and detect the 2D color code based on the detected base cells. The 2D color code is extractable according to an exemplary embodiment without a borderline surrounding the 2D color code. Therefore, a design of the 2D color code may be improved and have a better look.

According to an exemplary embodiment, a base cell has a borderline with a color different from a color of an inside of the base cell. However, when a base cell has a color different from a background image, the base cell may not have a borderline with a color different from a color of an inside of the base cell. According to an exemplary embodiment, a base cell has a color different from a background image.

Figure 19:
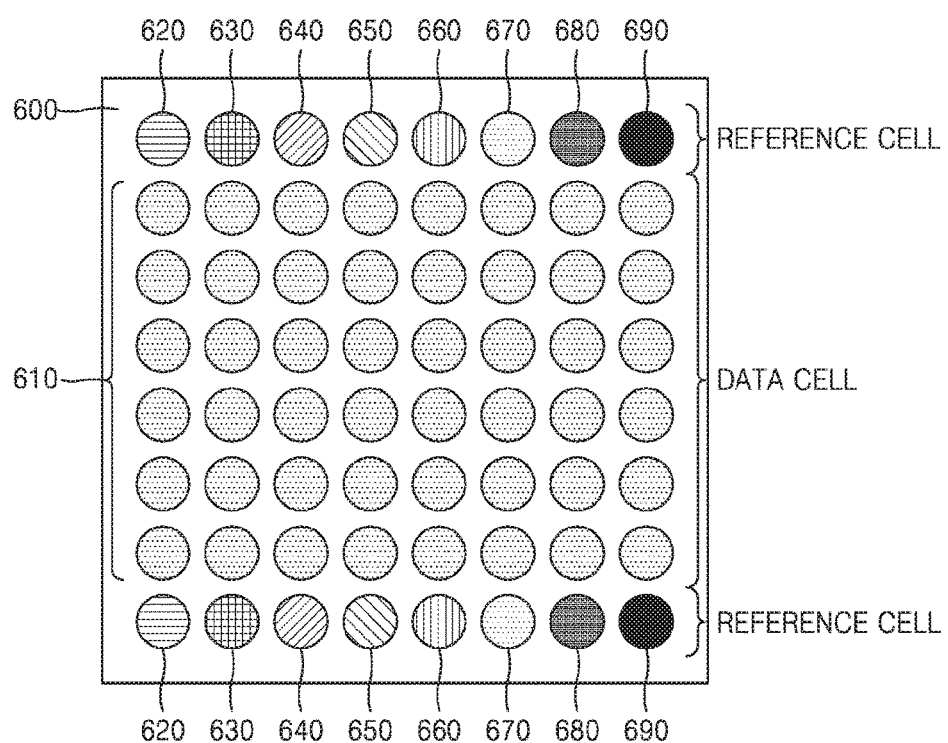
FIG. 19 illustrates an example 2D color code according to another exemplary embodiment.

FIG. 19 illustrates an example 2D color code according to another exemplary embodiment.

Referring to FIG. 19, the 2D color code 20 is overlaid on a background image 600. For convenience of description, a color of the background image 600 is assumed to be blue according to an exemplary embodiment. The 2D color code of FIG. 19 includes data cells 610 and reference cells 620, 630, 640, 650, 660, 670, 680, and 690. The reference cells are located in a line above and below data cells 610.

For example, a reference cell 620 is green, reference cell 630 is bluish green, reference cell 640 is yellow, reference cell 650 is orange, reference cell 660 is dark blue, reference cell 670 is waterish blue, reference cell 680 is murex, and reference cell 690 is red. Each of data cells 610 may have a color according to encoding transmission data.

In FIG. 19, four reference cells 620 and 690 are base cells. According to an exemplary embodiment, the base cells 620 and 690 are respectively green and red, and the background image 600 is blue. Therefore, the base cells 620 and 690 have colors different from to the color of the background image 600.

Colors of the base cells 620 and 690 may be any color different from the color of the background image 600. For example, the base cells 620 and 690 are respectively red and blue, the background image 600 is green. By color difference between a color the background image 600 which is overlaid with the 2D color code and colors of the base cells 620 and 690, the base cells 620 and 690 may not have a borderline with a color different from a color of insides of the base cells 620 and 690.

According to an exemplary embodiment, the electronic device may detect outlines in an image including a 2D color code. The electronic device may convert the image including the 2D color code to a component image based on a certain component, convert the component image to a binary image based on a threshold value, and then detect the outlines in the binary image.

The component image may be generated based on a component which is appropriate to distinguish pixel values of outlines of the base cells from pixel values of the background image, the pixel values of the outlines of the base cells are same with pixel values of insides of the base cells since the base cells have no borderline in an exemplary embodiment. A difference between the pixel values of the outlines of the base cells and the pixel values of the background image in the component image may be bigger than other images based on other components.

When the base cells 620 and 690 are respectively green and red, and the background image 600 is blue, the electronic device may generate a blue component image. Otherwise, the electronic device may generate two different component images respectively in response to detecting red and green base cells 690 and 620, and then combine results of detection. A red component image may be used for detecting red base cells 690, and a green component image may be used for detecting green base cells 620.

Figure 20:
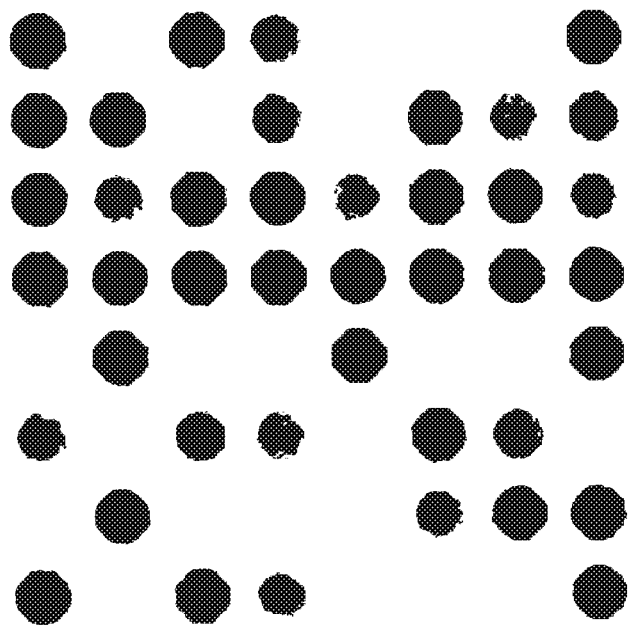
FIG. 20 illustrates an example component image.

FIG. 20 illustrates an example component image. In FIG. 20, the electronic device is assumed to generate a blue component image from an image including the 2D color code of FIG. 19. FIG. 19 schematically illustrates difference between colors of cells by hatching, and FIG. 20 illustrates a component image with actual colors. FIG. 19 illustrates data cells 610 with same hatching, but the data cells 610 may have different colors.

In the blue component image of FIG. 20, distinction between the base cells 620 and 690 and the background image 600 may become easier than the image of FIG. 19.

Figure 21:
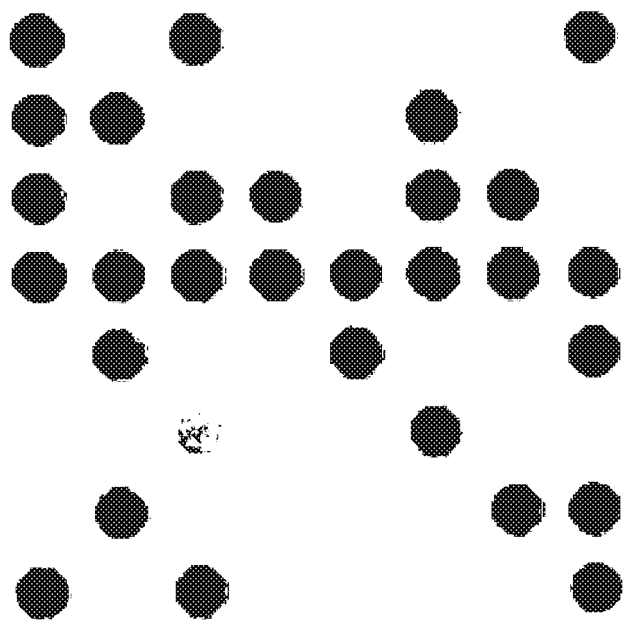
FIG. 21 illustrates an example binary image.

FIG. 21 illustrates an example binary image. The binary image of FIG. 21 may be generated by binarization of the component image of FIG. 20.

Figure 22:
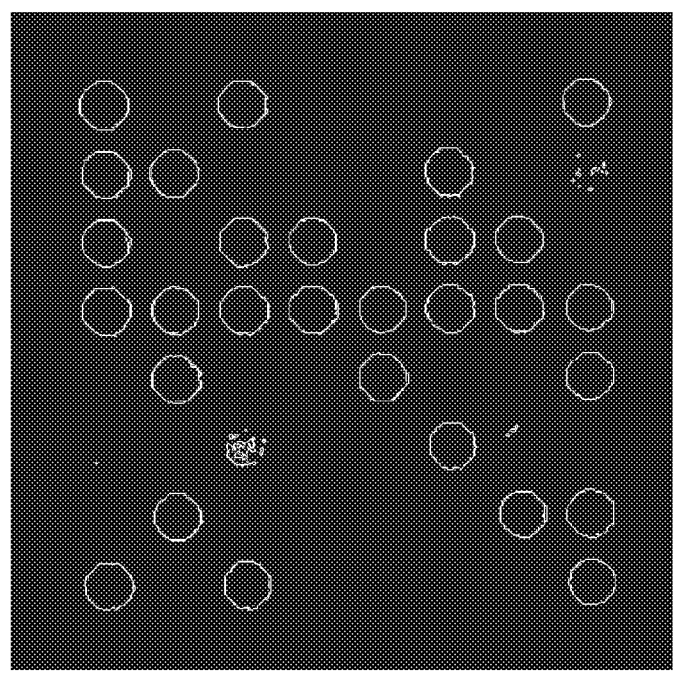
FIG. 22 illustrates an example outline detected in an image including a 2D color code.

FIG. 22 illustrates an example outline detected in an image including a 2D color code. FIG. 22 illustrates outlines detected in the binary image of FIG. 21.

Figure 23:
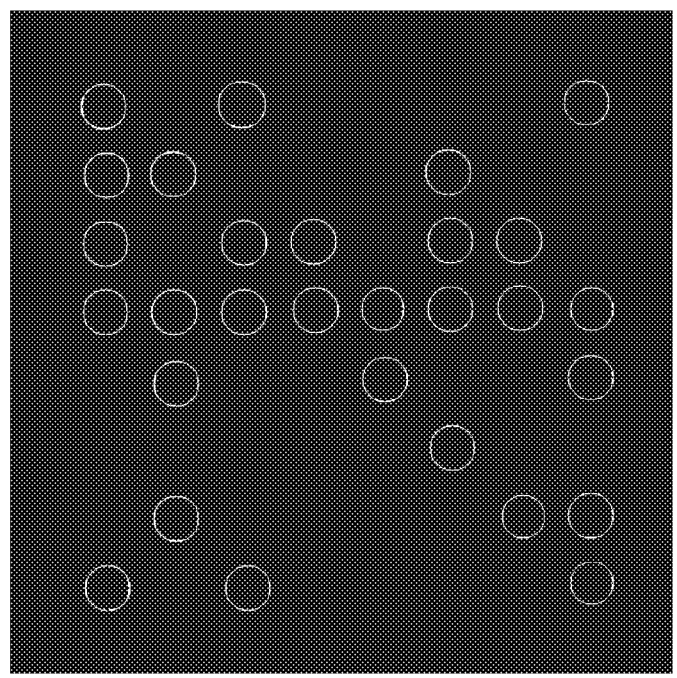
FIG. 23 illustrates example objects having same figures as base cells.

FIG. 23 illustrates an example objects having figure of base cells. FIG. 23 illustrates circular objects extracted in an image of a 2D color code when base cells are circular.

When comparing FIG. 23 with FIG. 19, objects including the base cells 620 and 690 at corners in the 2D color code are extracted. Therefore, the electronic device may detect data cells included in the 2D color code based on detected base cells 620 and 690 as described with respect to an exemplary embodiment.

According to an exemplary embodiment, the electronic device may detect base cells even with no borderline of cells in the 2D color code. Therefore, a design of the 2D color code may be improved and a limitation to the design may be reduced.

Exemplary embodiments are not limited to the above-described embodiments, and may change variously within the scope of the present disclosure. For example, a figure or the number of cells included in a 2D color code may be any figure or any number. A figure of cells may be any polygonal shape, and is not limited to being circular. The number of cells may be any number, and is not limited to the number of an 8×8 matrix. Locations of reference cells in the 2D color code may be any locations in the 2D color code, and are not limited to the upper or lower part of the 2D color code. The number of colors of reference cells included in the 2D color code, an order of lines of the reference cell, and the repeat number of the lines may vary, and are not limited to the above-described examples. A borderline surrounding a cell may have any color, and is not limited to white.

According to an exemplary embodiment, every cell of the 2D color code may respectively have a borderline, or only base cells may have borderlines but other cells such as data cells and reference cells may not have borderlines.

A location of a base cell in the 2D color code may be any location in the 2D color code, and is not limited to a corner of the 2D color code. A base cell may not be a reference cell.

A figure of the 2D color code may be any shaped figure, and is not limited to being rectangular.

FIGS. 24, 25, 26, and 27 illustrate a variety of example 2D color codes according to an exemplary embodiment.

Figure 24:
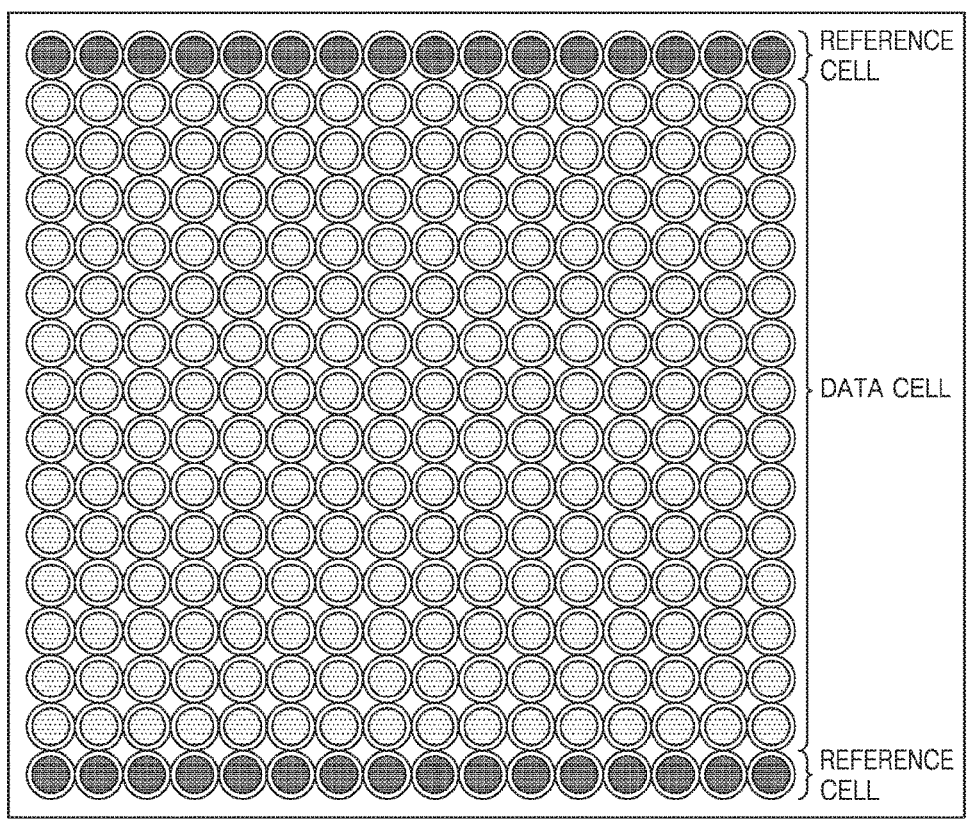
FIGS. 24, 25, 26, and 27 illustrate a variety of example 2D color codes, according to an exemplary embodiment.

Referring to FIG. 24, the number of cells included in a 2D color code is 16×16.

Figure 25:
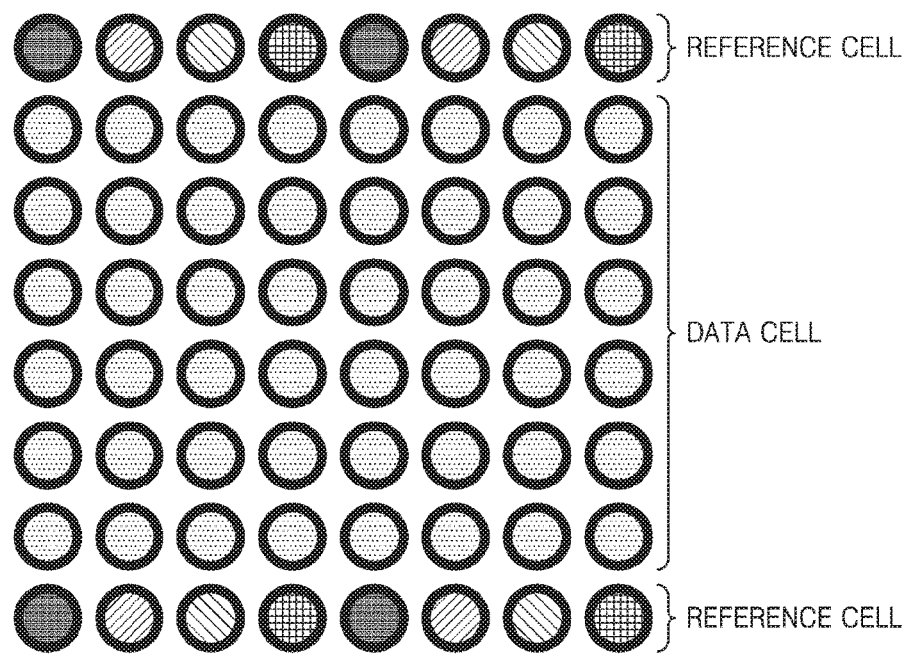

Referring to FIG. 25, a borderline surrounding a cell is black.

Figure 26:
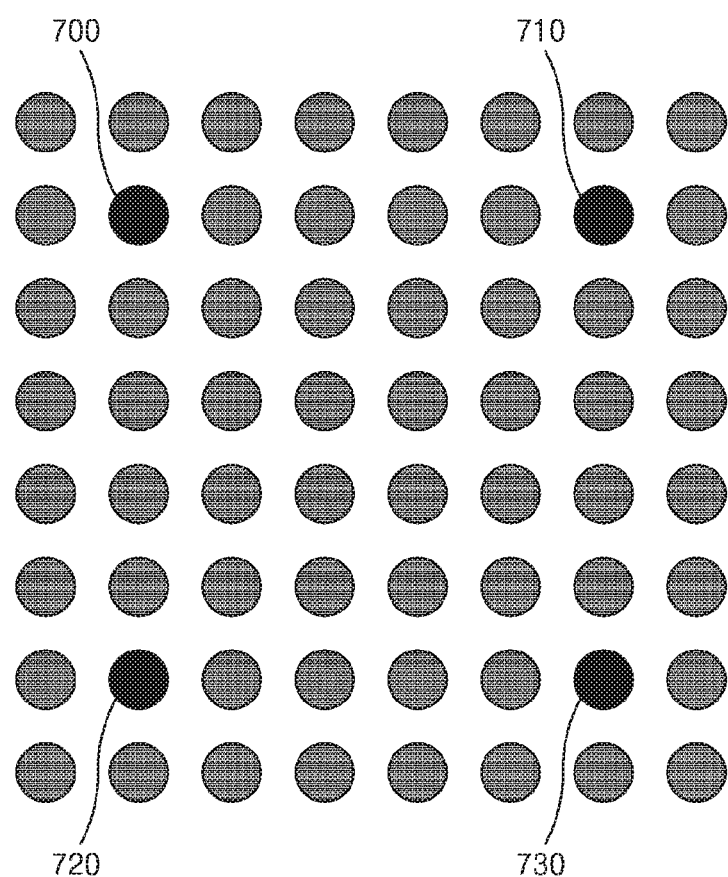

Referring to FIG. 26, base cells 700, 710, 720, and 730 are located inside of a 2D color code, not at its corners.

Figure 27:
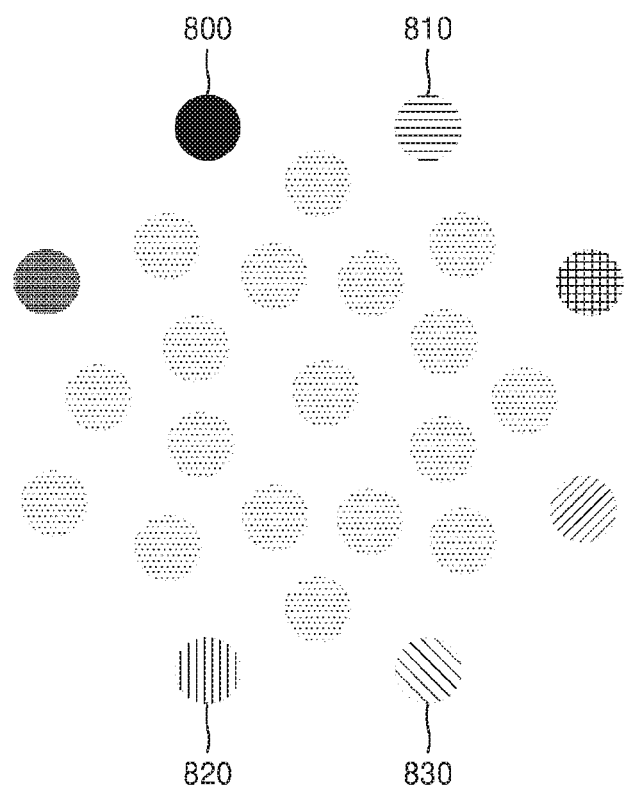

Referring to FIG. 27, a 2D color code where a plurality of cells are located may represent octagonal-like figure. In FIG. 27, base cells 800, 810, 820, and 830 are located in upper and lower parts of the 2D color code, the base cells 800, 810, 820, and 830 may be located inside the 2D color code or at other locations. For example, the reference cells may be 8 cells located close to an outside of the octagonal-like figure and surrounding inner cells.

An explanation of 4 CSK for encoding transmission data to data cell is given above by referring to FIG. 5, but other CSK encoding methods may be used. That is, the number and locations of data symbols on chromaticity coordinates may be any number and any location.

Figure 28:
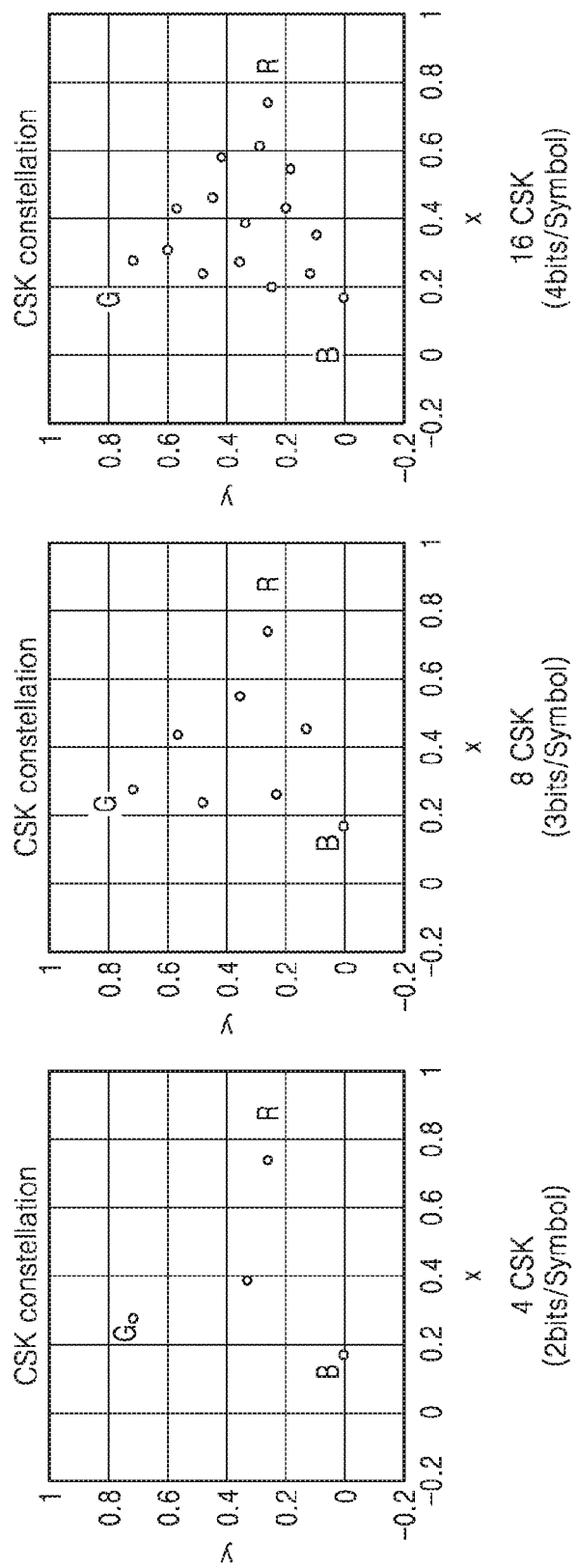
FIG. 28 illustrates a variety of example CSK encoding methods.

FIG. 28 illustrates a variety of example CSK encoding methods. FIG. 28 illustrates 4 CSK, 8 CSK and 16 CSK methods. Data of 2 bits/symbol is transmitted in 4 CSK, data of 3 bits/symbol is transmitted in 8 CSK, and data of 4 bits/symbol is transmitted in 16 CSK. By increasing the number of data symbols on chromaticity coordinates, amount of data per symbol is increased so that speed of transmission may increase.

A 2D color code in which data cells encoded from transmission data by CSK method are located may be referred to as a SDM-CSK code. A variety of SDM-SCK codes may be used according to exemplary embodiments.

Figure 29:
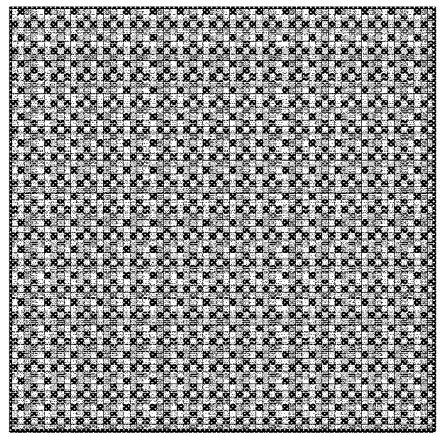
FIG. 29 illustrates example space division multiplex-CSK (SDM-CSK) codes for a 2D color code.
Figure 29:
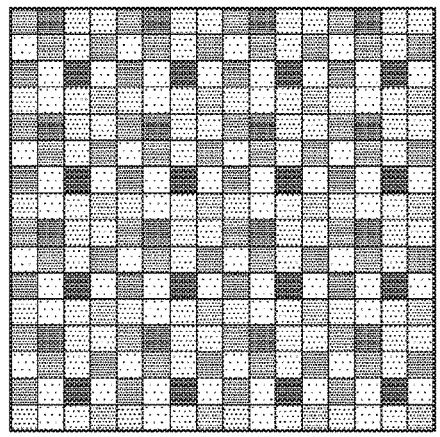
Figure 29:
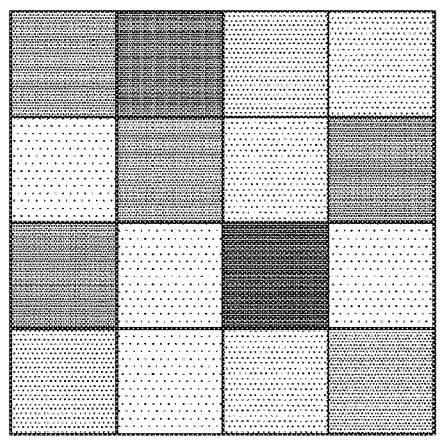

FIG. 29 illustrates example SDM-CSK codes for a 2D color code.

Referring to FIG. 29, 64×64 SDM-16 CSK code has 64×64 cells included in the 2D color code, and has 4 data symbols on chromaticity coordinates. 16×16 SDM-4 CSK code has 16×16 cells included in the 2D color code, and has 4 data symbols on chromaticity coordinates. 4×4 SDM-4

CSK code has 4×4 cells included in the 2D color code, and has 4 data symbols on chromaticity coordinates. Each code of FIG. 29 has different number of data cells and data symbols so their transmission bandwidths are different. For example, when a frame rate is 15 fps, 64×64 SDM-16 CSK code may have a transmission speed of 240 kbps, and 4×4 SDM-4 CSK code may have a transmission speed of 480 bps.

FIG. 30 illustrates an example 2D color code.

Referring to FIG. 30, the 2D color code is 16×16 SDM-4 CSK code where reference cells are located. The reference cells are located in upper and lower parts of the 2D color code. Each line of the reference cells has a repeat of a line of 4 reference colors. D0 through D49 represent data cells, FRTN represents the total number of frames, FREM represents the number of remaining frames, and P0 through P3 represent error correcting codes. The 2D color code is surrounded by a black bold borderline and a white bold borderline.

The electronic device may use borderlines surrounding the 2D color code to detect the 2D color code in an image including the 2D color code.

By eliminating borderlines surrounding a 2D color code, a design of the 2D color code may be improved.

According to an exemplary embodiment, the 2D color code may have no borderline which is illustrated in FIG. 30. According to an exemplary embodiment, a displaying device, an electronic device, an operation method of the displaying device, and an operation method of the electronic device may be provided to improve a design of 2D color code.

Figure 31:
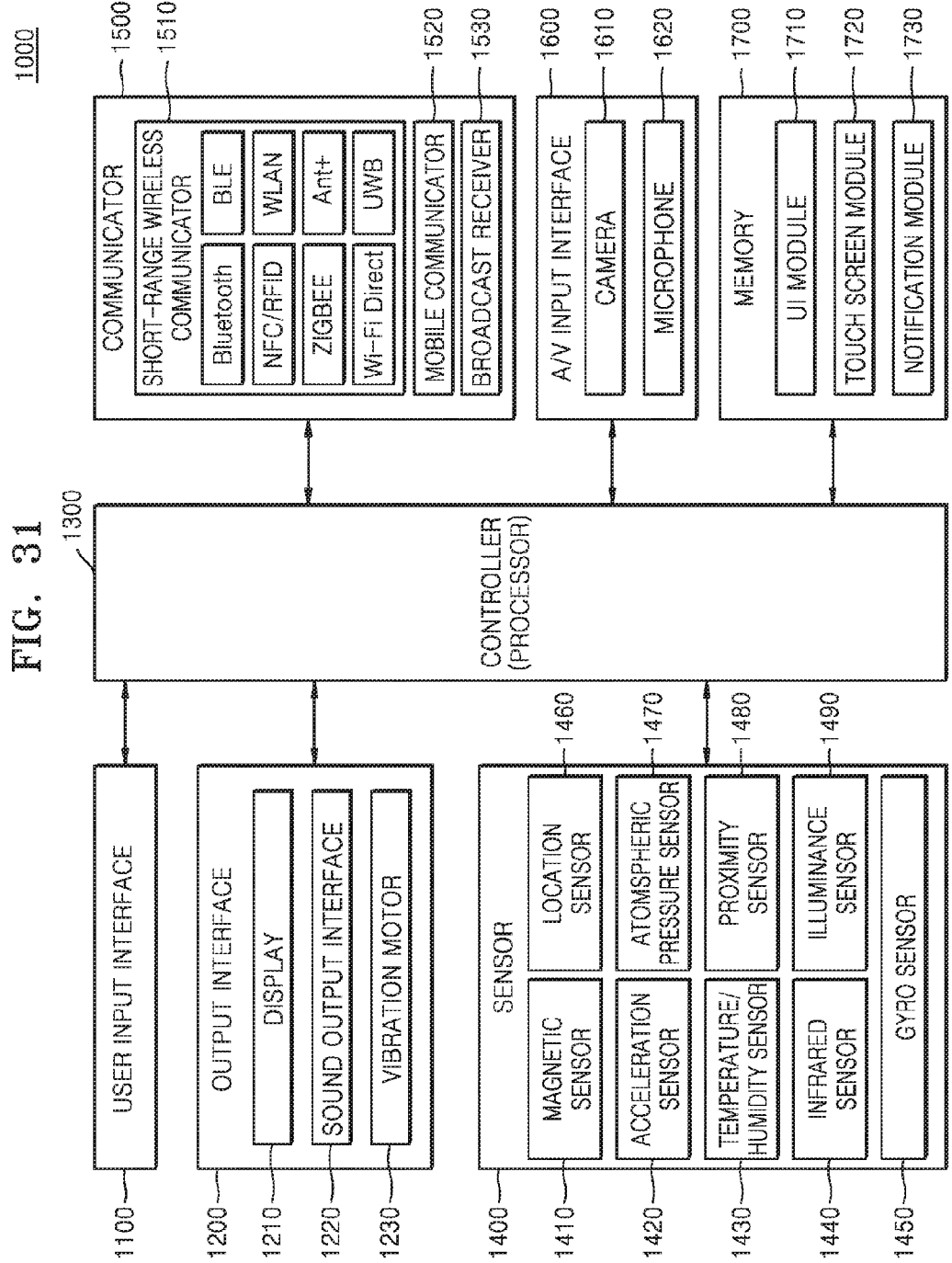
FIG. 31 illustrates an example electronic device, according to an exemplary embodiment.

FIG. 31 illustrates an example electronic device.

According to an exemplary embodiment, an electronic device 1000 may include a camera 1610 and a controller 1300. The camera 1610 and the controller 1300 corresponds to the camera 210 and the controller 220 of FIG. 6. All of the above-described exemplary embodiments are applicable to the electronic device of FIG. 31. Therefore, redundant explanation is omitted.

The electronic device 1000 may further include a user input interface 1100, a output interface 1200, a sensor 1400, a communicator 1500, A/V input interface 1600, and a memory 1700. However, the components shown in FIG. 31 are not essential components of the electronic device 1000. The electronic device 1000 may be implemented by more or less components than shown in FIG. 31.

The user input interface 1100 may be used for a user to input data to control the electronic device 1000. For example, the user interface 1100 may be a key pad, a dome switch, a touch pad (e.g., contact electrostatic capacitive type, pressure resistive film type, infrared detection type, surface acoustic wave propagation type, integral strain gauge type, piezo-effect type, etc.), a jog wheel, and a jog switch, but is not limited thereto.

The user input interface 1100 may receive a user input for receiving the 2D color code. The electronic device 1000 may capture and decode the 2D color code to obtain data in response to a user input.

The output interface 1200 may be used for outputting an audio signal, a video signal, or a vibration signal, and may include a display 1210, a sound output interface, and a vibration motor 1230. The output interface 1200 may output data obtained by decoding the 2D color code or output a result of operation performed based on the obtained data The display 1210 may display information processed in the transmitting device 1000. The display 1210 and a touch pad may be overlaid with each other to function as a touch screen, and the display 1210 may be used as not only an output device but also an input device. The display 1210 may include at least one from among a liquid crystal display (LCD), a thin-film transistor-liquid crystal display (TFT-LCD), an organic light-emitting diode (OLED), a flexible display, a 3D display, and an electrophoretic display. Furthermore, the electronic device 1000 may include two or more displays 1210 according to exemplary embodiments. The two or more displays 1210 may be disposed to face each other across a hinge.

The sound output interface 1220 may output audio data received from the communicator 1500 or stored in the memory 1700. Furthermore, the sound output interface 1220 may output a sound signal (e.g., a call signal reception sound, a message reception sound, a notification sound, etc.) related to a function performed by the electronic device. The sound output interface 1220 may include a speaker, a buzzer, etc.

The vibration motor 1230 may output a vibration signal. For example, the vibration motor 1230 may output a vibration signal based on outputting audio or video data. The vibration motor 1230 may output a vibration signal in response to receiving a touch input.

The controller 1300 may generally control the overall operation of the electronic device 1000. For example, the controller 1300 may execute programs stored in the memory 1700 to control the user input interface 1100, the output interface 1200, the sensor 1400, the communicator 1500, and the A/V input interface, etc. The controller may control the camera 1610 to perform operations of the electronic device 1000 as described above.

The controller may detect base cells in an image including a 2D color code and detect the 2D color code based on the detected base cells. The controller 1300 may decode the detected 2D color code to obtain data. An explanation of operations performed by the controller 1300 is described above.

The sensor 1400 may sense a state of or ambient state of the electronic device 1000 and transmit a result of the sensing to the controller 1300.

The sensor may include at least one from among a magnetic sensor 1410, an acceleration sensor 1420, a temperature/humidity sensor 1430, an infrared sensor 1440, a gyroscope 1450, a location sensor 1460 such as a GPS, an atmospheric pressure sensor 1470, a proximity sensor 1480, and a illuminance sensor 1490, but is not limited thereto. A function of each sensor would be intuitively inferred by those of ordinary skill in the art, and detailed explanation thereof is omitted.

The communicator 1500 may include at least one element for establishing communication with other devices. For example, the communicator 1500 may include a short-range communicator 1510, a mobile communicator 1520, and a broadcast receiver 1530.

The short-range communicator 1510 may include a BLUETOOTH communicator, a BLUETOOTH Low Energy (BLE) communicator, a Near Field Communicator, a WLAN communicator, a ZigBee communicator, an Infrared Data Association communicator, a Wi-Fi Direct communicator, a Ultra WideBand communicator, an Ant+ communicator, a Z-wave communicator, etc.

The mobile communicator 1520 may communicate a wireless signal with at least one from among a base station, an external terminal, and a server via a mobile communication networks. The wireless signal may include a voice call signal, a video call signal, or any types of data to communicate a text/multimedia message.

The broadcast receiver 1530 may receive a broadcasting signal and/or broadcast-related information from the outside via a broadcasting channel. The broadcasting channel may include a satellite channel, a terrestrial channel, etc. The electronic device 1000 may not include the broadcast receiver 1530 according to exemplary embodiments.

The A/V input interface 1600 may include a camera 1610 and a microphone 1620 to receive an audio signal or a video signal. The camera 1610 may capture an image including the 2D color code to obtain the 2D color code. Images captured by the camera 1610 may be processed by the controller 1300 or a image processor.

Images captured by the camera 1610 may be stored in the memory 1700, or transmitted to the outside through the communicator 1500. The electronic device 1000 may include two or more cameras 1610 according to exemplary embodiments.

The microphone 1620 may receive and process a sound signal from the outside to convert it to an electronic sound data. For example, the microphone 1620 may receive a sound signal from an external device or a speaker. The microphone 1620 may employ any of various noise-reduction algorithms to reduce noise occurring while receiving a sound signal from the outside.

The microphone 1620 may receive a user input to receive the 2D color code displayed on the displaying device.—

The memory 1700 may store programs for processing and controlling of the controller 1300, and store data input to or output from the electronic device 1000.

The memory 1700 may include at least one from among a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), a programmable ROM (PROM), an electrically erasable PROM (EEPROM), a magnetic memory, a magnetic disk, and an optical disc.

Programs stored in the memory 1700 may be classified into a plurality of modules such as a UI module 1710, a touch screen module 1720, and a notification module 1730 according to exemplary embodiments.

The UI module 1710 may provide a UI or a GUI according to each application to interact with the electronic device 1000. For example, the UI module 1710 may provide a UI for receiving a user input to receive the 2D color code.

The touch screen module 1720 may detect a user's touch gesture on a touch screen and transmit information regarding the touch gesture to the controller 1300. The touch screen module 1720 according to an exemplary embodiment may recognize and analyze touch codes. The touch screen module 1720 may be embodied as another hardware including a controller.

A sensor may be employed in or near the touch screen to detect a touch or a proximity touch on or above the touch screen. The sensor employed to detect a touch may be a tactile sensor. The tactile sensor may sense a contact of an object to a certain extent, the extent being equal to or more than humans do. The tactile sensor may detect various information such as a roughness of a contact surface, hardness of a contacting object, and a temperature at a contact point.

The sensor employed to detect a touch may be a proximity sensor.

The proximity sensor may detect an object approaching or near a detection surface without a physical contact by using the force of an electromagnetic field or an infrared ray. The proximity sensor may be a transmissive photoelectric sensor, a direct reflective photoelectric sensor, a mirror reflective photoelectric sensor, a high-frequency oscillation proximity sensor, a capacitive proximity sensor, a magnetic proximity sensor, and an infrared proximity sensor, but is not limited thereto. The touch gesture may include a tap, a touch and hold gesture, a double tap, dragging, panning, a flick, a drag and stop gesture, a swipe, or so on.

The notification module 1730 may generate a signal for notifying an occurrence of an event at the electronic device 1000. The event occurring at the electronic device 1000 may include a call signal reception, a message reception, a key signal reception, a schedule notification, etc. The notification module 1730 may output a notification signal through the display unit 1210 in the form of a video signal, through the sound output unit 1220 in the form of a sound signal, or though the vibration motor 1230 in the form of a vibration signal.

Furthermore, exemplary embodiments described above are implemented by a hardware component, but exemplary embodiments may be implemented by a software component such as a computer program executable by a CPU.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
   a memory configured to store instructions; and
   at least one processor, coupled to the memory, configured to execute the instructions to:
   obtain an image including a two-dimensional (2D) color code in which a plurality of cells are located, the plurality of cells comprising base cells, reference cells, and data cells;
   detect outlines of objects in the image including the 2D color code;
   based on a first figure of the base cells, a color of the base cells, and a second figure whose vertex is defined by the base cells, detect the base cells among the objects that are identified based on the detected outlines, and detect candidates of the base cells among the objects that are identified based on the detected outlines;
detect candidates of the reference cells based on a location of the candidates of the base cells;
detect the 2D color code in the image based on the detected base cells in the 2D color code;
decode colors of the data cells included in the 2D color code to obtain data; and
determine a validity of the candidates of the base cells based on a color of the candidates of the reference cells and a color of the reference cells.

2. The electronic device of claim 1, wherein:
the base cells included in the 2D color code have an outline with a color that is different from the color of the base cells.

3. The electronic device of claim 1, wherein:
the first figure of the base cells is circular.

4. The electronic device of claim 1, wherein:
figures of the plurality of cells are circular.

5. The electronic device of claim 1, wherein:
the memory is further configured to store information about the first figure, the second figure, the color of the base cells, and a location of the base cells in the 2D color code.

6. The electronic device of claim 1, wherein:
the memory is further configured to store information about the first figure, the second figure, the color of the base cells, a location of the base cells in the 2D color code, and a color and a location of the reference cells in the 2D color code.

7. The electronic device of claim 1, wherein:
the image comprises a plurality of frame images; and
the processor is further configured to execute the instructions to detect base cells in one frame image among the plurality of the frame images based on base cells detected in a previous frame image.

8. The electronic device of claim 7, wherein:
the processor is further configured to execute the instructions to limit a region to detect the base cells in the one frame image among the plurality of the frame images, based on the base cells detected in the previous frame image.

9. The electronic device of claim 1, wherein:
the processor is further configured to execute the instructions to:
generate a component image by converting the image based on a predetermined component;
generate a binary image by converting the component image based on a predetermined threshold; and
detect the outlines based on the binary image.

10. An operating method of an electronic device, the operating method comprising:
obtaining an image including a two-dimensional (2D) color code in which a plurality of cells are located, the plurality of cells comprising base cells, reference cells, and data cells;
detecting outlines of objects in the image including the 2D color code;
based on a first figure of the base cells, a color of the base cells, and a second figure whose vertex is defined by the base cells, detecting the base cells among the objects that are identified based on the detected outlines, and detecting candidates of the base cells among the objects that are identified based on the detected outlines;
detecting candidates of the reference cells based on a location of the candidates of the base cells;
detecting the 2D color code in the image, based on the detected base cells in the 2D color code;
decode colors of the data cells included in the 2D color code to obtain data; and
determine a validity of the candidates of the base cells based on a color of the candidates of the reference cells and a color of the reference cells.

11. The operating method of claim 10, wherein:
the base cells included in the 2D color code have an outline with a color that is different from the color of the base cells.

12. The operating method of claim 11, wherein:
the first figure of the base cells is circular.

13. The operating method of claim 12, wherein:
figures of the plurality of cells are circular.

14. The operating method of claim 10, further comprising:
storing information about the first figure, the second figure, the color of the base cells, and a location of the base cells in the 2D color code.

15. The operating method of claim 10, further comprising:
storing information about the first figure, the second figure, the color of the base cells, a location of the base cells in the 2D color code, and a color and a location of the reference cells in the 2D color code.

16. The operating method of claim 10, wherein:
the image comprises a plurality of frame images; and
the detecting of the base cells comprises detecting base cells in one frame image among the plurality of the frame images based on base cells detected in a previous frame image.

17. The operating method of claim 16, wherein:
the detecting of the base cells comprises limiting a region to detect the base cells in the one frame image among the plurality of the frame images based on the base cells detected in the previous frame image.

18. An electronic device comprising:
a memory configured to store instructions; and
at least one processor, coupled to the memory, configured to execute the instructions to:
generate a two-dimensional (2D) color code in which a plurality of cells are located, the plurality of cells comprising base cells, reference cells, and data cells; and
display an image including the generated 2D color code,
wherein the 2D color code is generated based on a first figure of the base cells, a color of the base cells, and a second figure whose vertex is defined by the base cells such that the base cells among objects that are identified based on outlines of the objects are detected by another device, the outlines being detected in the image including the generated 2D color code, and
wherein candidates of the base cells among the objects that are identified based on the outlines are detected by the another device, candidates of the reference cells are detected based on a location of the candidates of the base cells, and a validity of the candidates of the base cells is determined based on a color of the candidates of the reference cells and a color of the reference cells.

* * * * *